(12) United States Patent
Shahar

(10) Patent No.: US 9,442,197 B2
(45) Date of Patent: Sep. 13, 2016

(54) METHOD AND SYSTEMS FOR A SWIVELING DETECTOR HEAD

(71) Applicant: General Electric Company, Schenectady, NY (US)

(72) Inventor: Arie Shahar, Moshav Magshimim (IL)

(73) Assignee: General Electric Company, Schenectady, NY (US)

( * ) Notice: Subject to any disclaimer, the term of this patent is extended or adjusted under 35 U.S.C. 154(b) by 16 days.

(21) Appl. No.: 14/486,965

(22) Filed: Sep. 15, 2014

(65) Prior Publication Data
US 2016/0077217 A1    Mar. 17, 2016

(51) Int. Cl.
*G01T 1/161*    (2006.01)
*G01T 1/164*    (2006.01)

(52) U.S. Cl.
CPC .................... *G01T 1/1648* (2013.01)

(58) Field of Classification Search
CPC ...................................................... G01T 1/161
See application file for complete search history.

(56) References Cited

U.S. PATENT DOCUMENTS

| | | | |
|---|---|---|---|
| 7,671,340 B2* | 3/2010 | Uribe et al. | 250/363.1 |
| 9,029,791 B1* | 5/2015 | Kovalski et al. | 250/369 |
| 9,144,411 B2* | 9/2015 | Tsukerman et al. | |
| 2008/0001088 A1* | 1/2008 | Joung | 250/363.1 |
| 2009/0080613 A1* | 3/2009 | Kruger | 378/87 |
| 2010/0219348 A1* | 9/2010 | Peter | 250/363.04 |
| 2011/0103544 A1* | 5/2011 | Hermony | 378/19 |
| 2012/0061581 A1* | 3/2012 | Hugg et al. | 250/394 |
| 2014/0138556 A1* | 5/2014 | Shahar et al. | 250/394 |
| 2014/0187923 A1 | 7/2014 | Heukensfeldt Jansen et al. | |
| 2015/0065873 A1* | 3/2015 | Tsukerman et al. | 600/436 |
| 2015/0302945 A1* | 10/2015 | Shahar et al. | 250/394 |

OTHER PUBLICATIONS

Tsukerman, Leonid, "Methods and Systems for Controlling Movement of Detectors Having Multiple Detectors Heads," U.S. Appl. No. 14/016,939, filed Sep. 23, 2013, 33 pages.

* cited by examiner

Primary Examiner — Marcus Taningco
(74) Attorney, Agent, or Firm — Alleman Hall McCoy Russell & Tuttle LLP

(57) ABSTRACT

Various methods and systems are provided for nuclear medicine imaging. In one example, an imaging detector unit comprises a detector assembly to detect radiation and to generate electrical signals in response to the detected radiation, and a single-dimension pinhole array to direct the radiation to the detector assembly.

23 Claims, 13 Drawing Sheets

METHOD AND SYSTEMS FOR A SWIVELING DETECTOR HEAD

FIELD

Embodiments of the subject matter disclosed herein relate generally to medical imaging systems, and more particularly to Nuclear Medicine (NM) imaging systems.

BACKGROUND

In nuclear medicine imaging, systems with multiple detectors or detector heads may be used to image a subject. For example, the detectors may be positioned adjacent to the subject to acquire nuclear medicine imaging data (e.g., radioactivity), which is used to generate a three-dimensional (3D) image of the subject. In a specific example, Single Photon Emission Computed Tomography (SPECT) systems may have moving detector heads, such as gamma cameras, positioned to focus on a region of interest. One or more of the gamma cameras may be moved (for example, rotated) to different angular positions to acquire image data. The acquired image data may then be used to generate 3D images.

In conventional SPECT camera systems with multiple swinging detector heads, the detectors swing about a fixed pivot. The rotational movement of each detector head limits the size of the detector head, to ensure detector heads do not collide with one another during rotation. As a result, gaps may exist between the detectors to accommodate full rotational motion of the detectors. These gaps limit the number of detectors that can be used to focus on a region of interest of the subject and thus limit the sensitivity of the imaging system.

BRIEF DESCRIPTION

In one embodiment, an imaging detector unit comprises a detector assembly to detect radiation and to generate electrical signals in response to the detected radiation, and a single-dimension pinhole array to collect and direct the radiation to the detector assembly, the single-dimension pinhole array including an array of openings wherein each opening collects and directs the radiation in a first dimension and in a second dimension, the first and the second dimensions perpendicular to each other.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below:

FIG. 7 is a schematic illustration of one interleaving component serving as a collimator divider from which a section of a parallel collimator in a unit of a parallel collimator and two single-dimensional pinhole arrays consists of.

FIG. 8 is a schematic illustration of one interleaving component serving as a collimator divider from which a unit of a parallel collimator and two single-dimensional pinhole arrays consists of.

DETAILED DESCRIPTION

Figure 1:
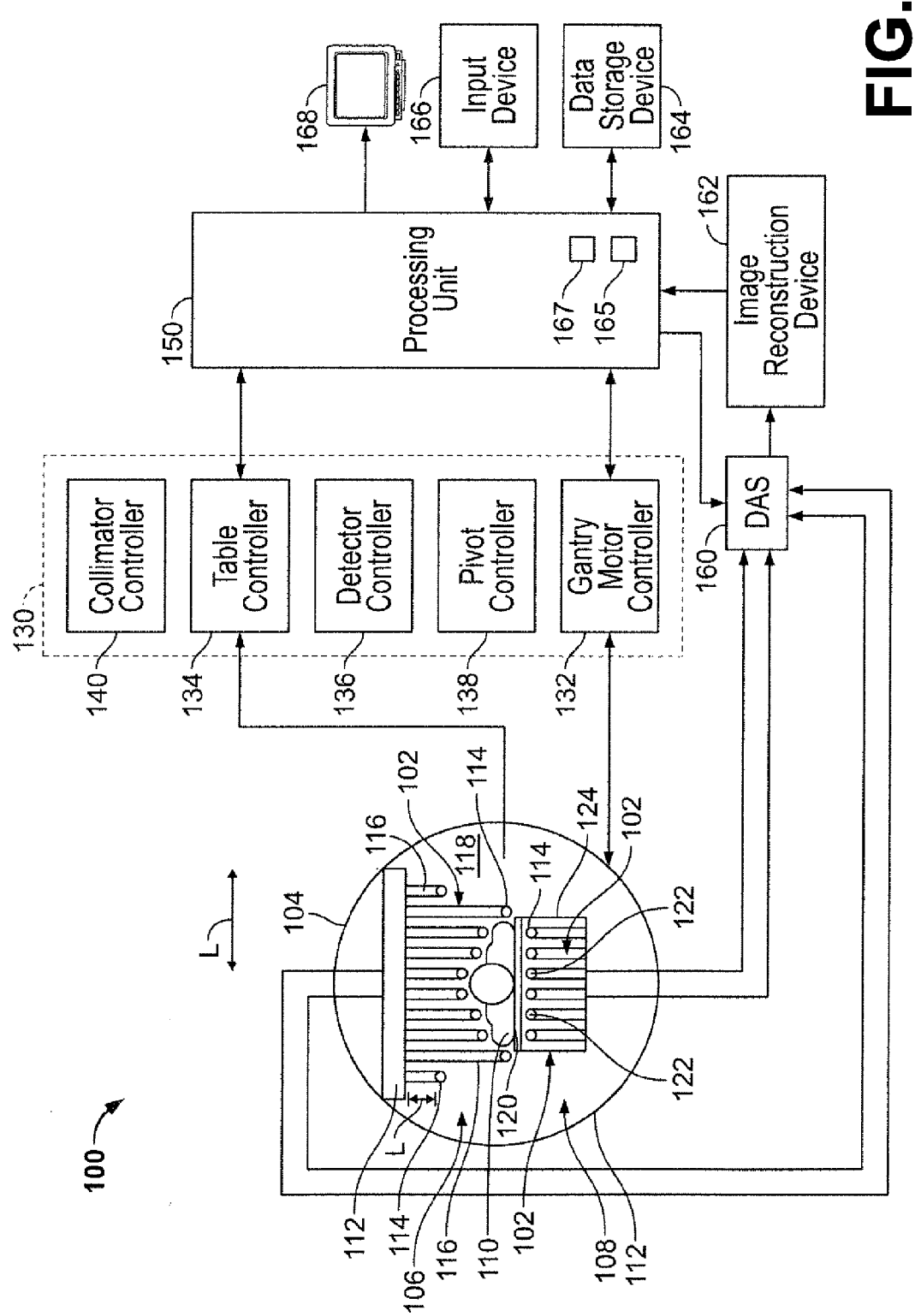
FIG. 1 is a schematic block diagram of a Nuclear Imaging (NM) imaging system in accordance with an embodiment.

The following description relates to various embodiments of imaging systems. In particular, methods and systems for a general purpose cadmium zinc telluride (CZT) nuclear imaging system (also referred to as a GPC system) are provided to increase the sensitivity of image acquisition. The GPC system includes arrays of swiveling detectors, where each detector includes a CZT wafer to detect radiation emanating from a patient, for example. The radiation may include gamma rays, X-rays, and/or other suitable signals. The rotational motion of the detectors dictates that the detectors be separated from each other by a gap defined by an imaginary confining circle produced by the rotational movement of the detectors. These gaps limit the number of detectors that can be used to cover a certain area on the patient body and thus limit the sensitivity of the imaging system. One approach for increasing the sensitivity of the GPC system includes increasing the thickness of the CZT wafers. However, increasing the thickness of the CZT wafer, for example from 5 mm to 7.5 mm, provides only a marginal increase in sensitivity, due to the stopping power of the wafer, and greatly increases the cost of the system.

According to embodiments disclosed herein, the sensitivity of the detector modules is increased by using standard-thickness CZT detector wafers arranged to use the whole space in the imaginary confining circle, which is currently unused. This is achieved by using the current module structure, which includes a parallel collimator to direct radiation to an array of CZT detector pixels, and adding side arrays of one-dimensional pinhole arrays on both sides of the current detector module. In swiveling detectors, the unique design of the side single-dimension pinhole array, unlike conventional pinhole, has the same sensitivity as the parallel collimator for both point sources (for example, lesions) and area sources (for example, organ imaging). Since the design is based on the standard 5 mm CZT wafers, this detector is lower in cost than the 7.5 mm-CZT wafer detector described above and provides an increased sensitivity compared to the conventional 5 mm thick detector (e.g., 160%) as well as compared to 7.5 mm thick detector (e.g., 150% increased sensitivity). In addition, the pinhole arrays provide a wider scanning angle. Accordingly, the proposed detector provides increased efficiency at a lower cost.

The foregoing summary, as well as the following detailed description of certain embodiments, will be better understood when read in conjunction with the appended drawings. To the extent that the figures illustrate diagrams of the functional blocks of various embodiments, the functional blocks are not necessarily indicative of the division between hardware circuitry. For example, one or more of the functional blocks (e.g., processors or memories) may be implemented in a single piece of hardware (e.g., a general purpose signal processor or a block of random access memory, hard disk, or the like) or multiple pieces of hardware. Similarly, the programs may be standalone programs, may be incorporated as subroutines in an operating system, may be functions in an installed software package, and the like. It should be understood that the various embodiments are not limited to the arrangements and instrumentality shown in the drawings.

Figure 2:
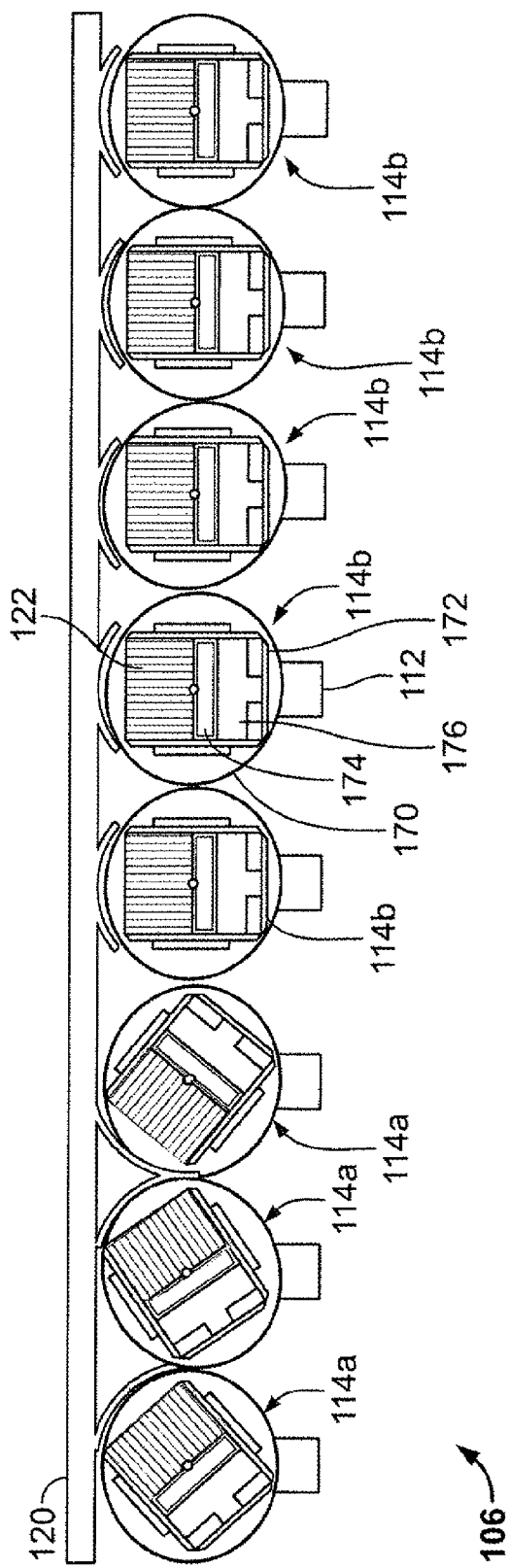
FIG. 2 is a schematic block diagram illustrating detector units in accordance with an embodiment.
Figure 11:
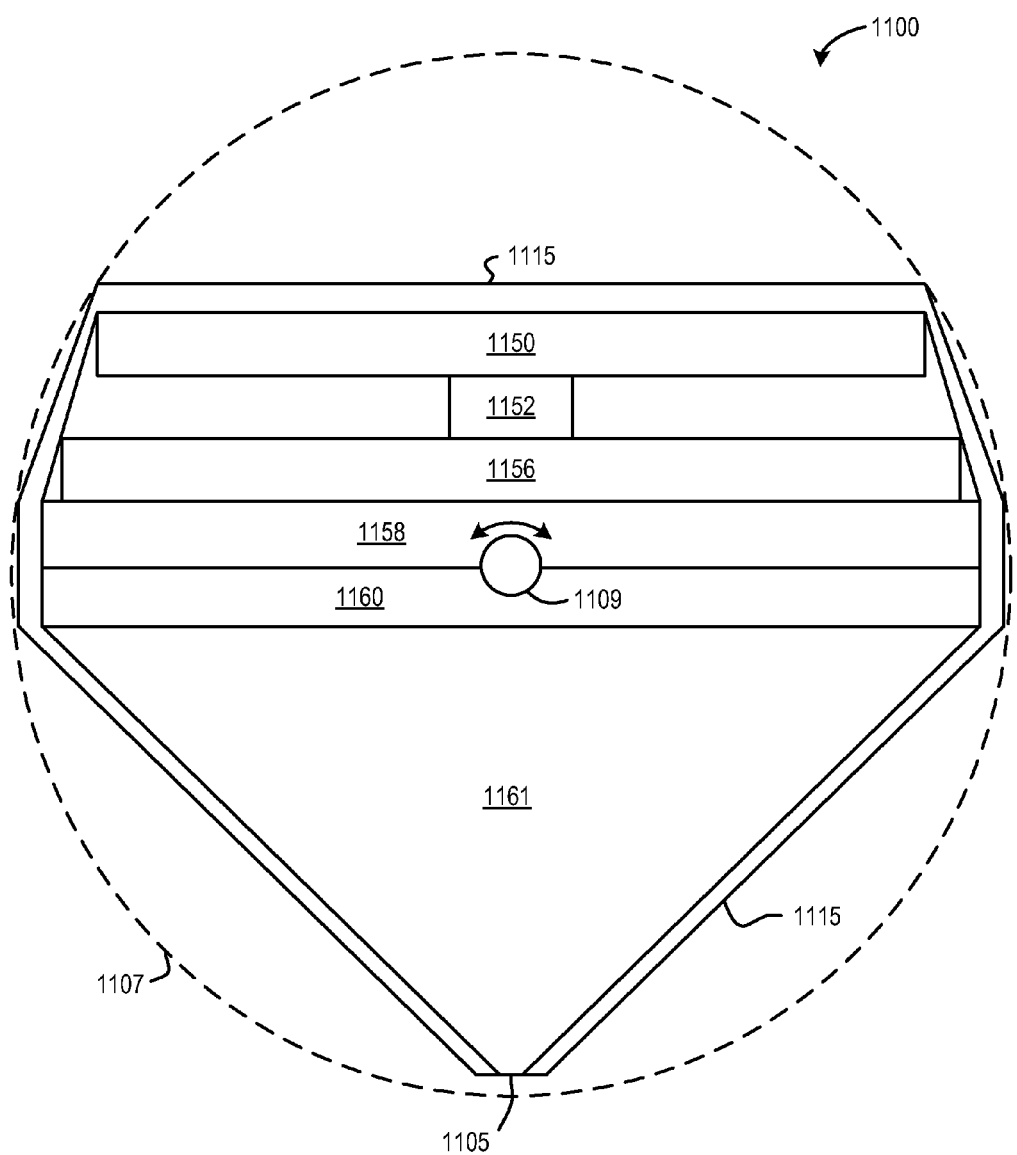
FIG. 11 is a cross-sectional view of a detector unit with a single-dimensional pinhole array.
Figure 12:
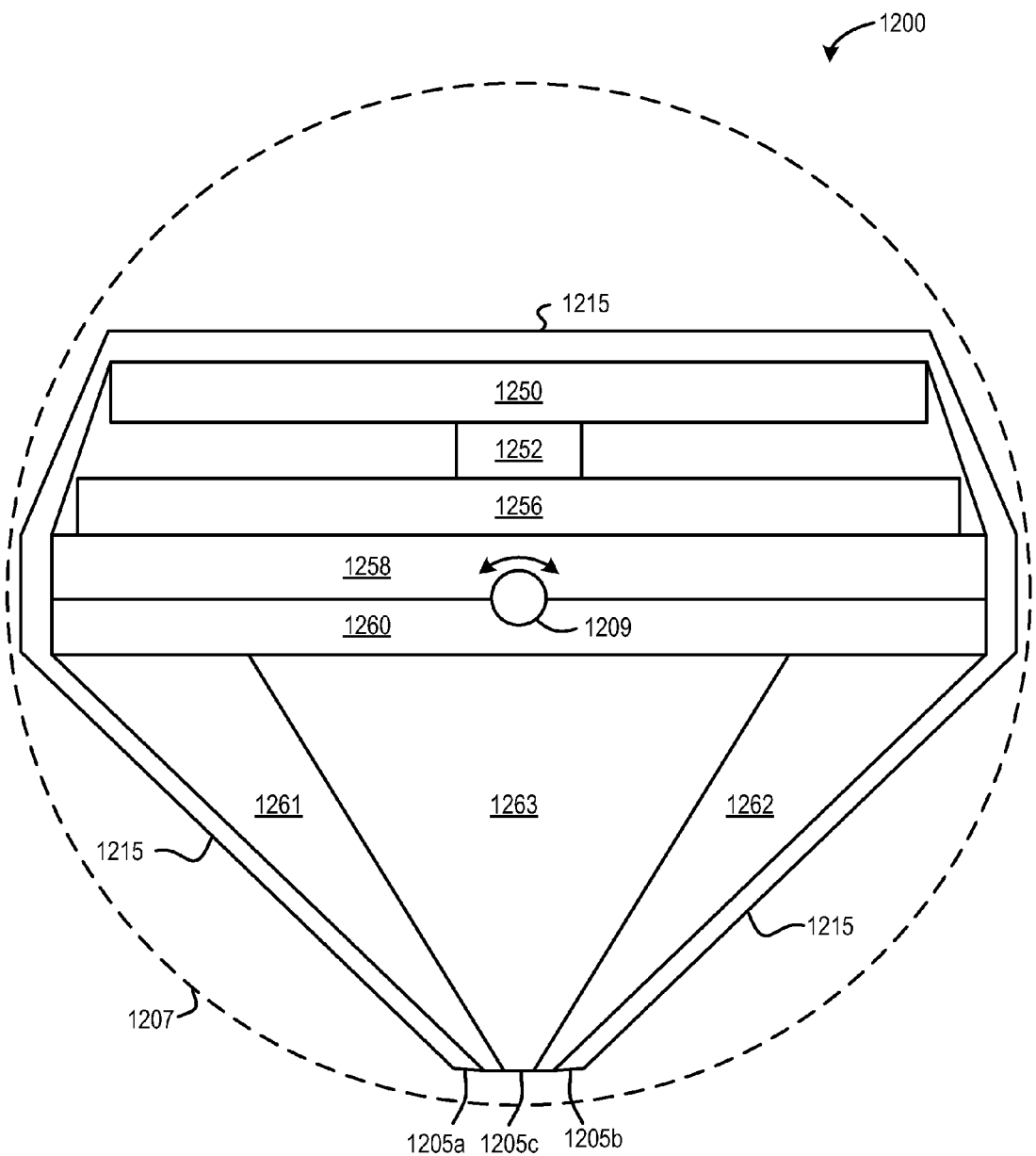
FIG. 12 is a cross-sectional view of a detector unit with multiple single-dimensional pinhole arrays having individual and adjacent apertures.
Figure 13:
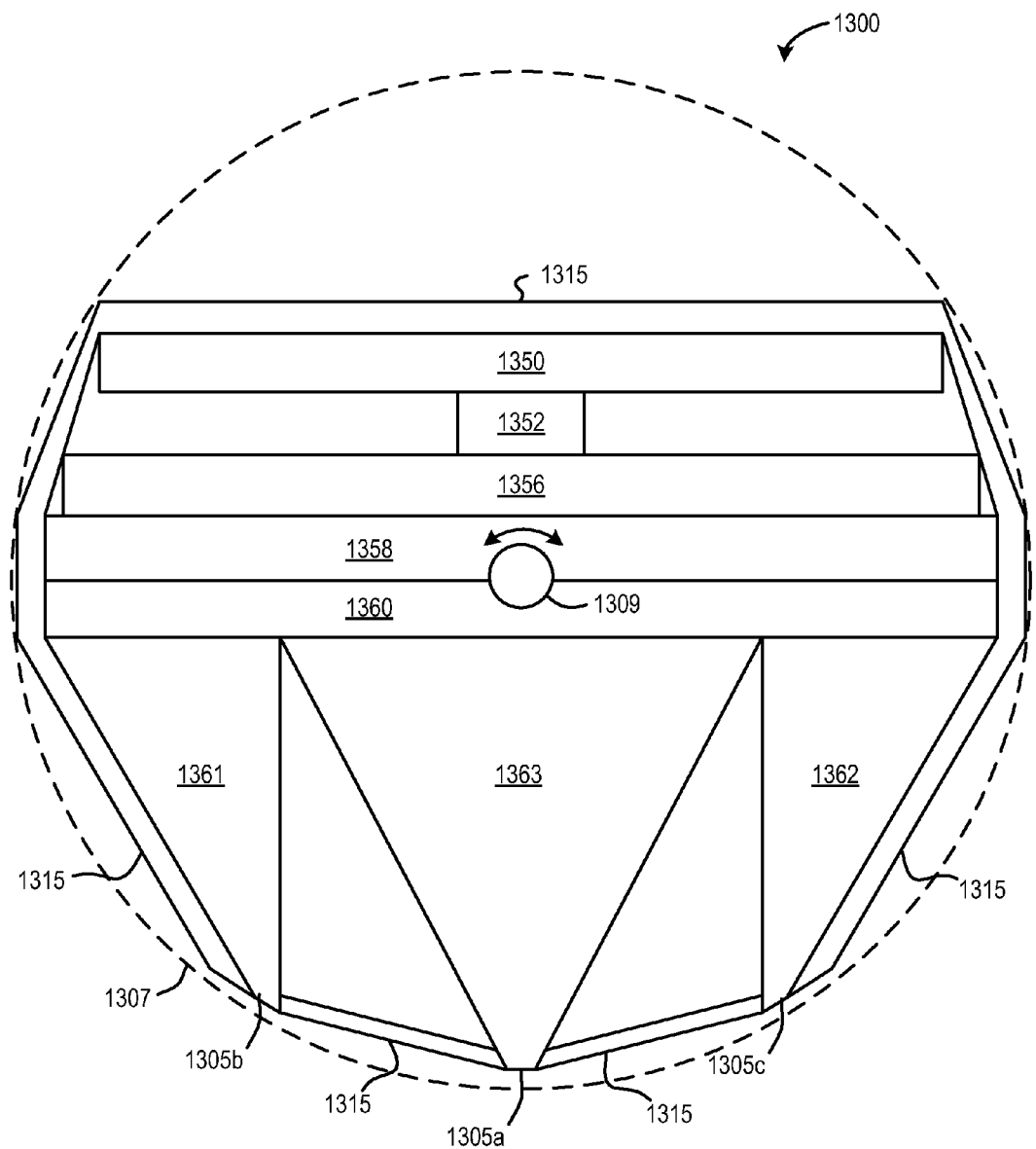
FIG. 13 is a cross-sectional view of a detector unit with multiple single-dimensional pinhole arrays having individual and separated apertures.
Figure 14:
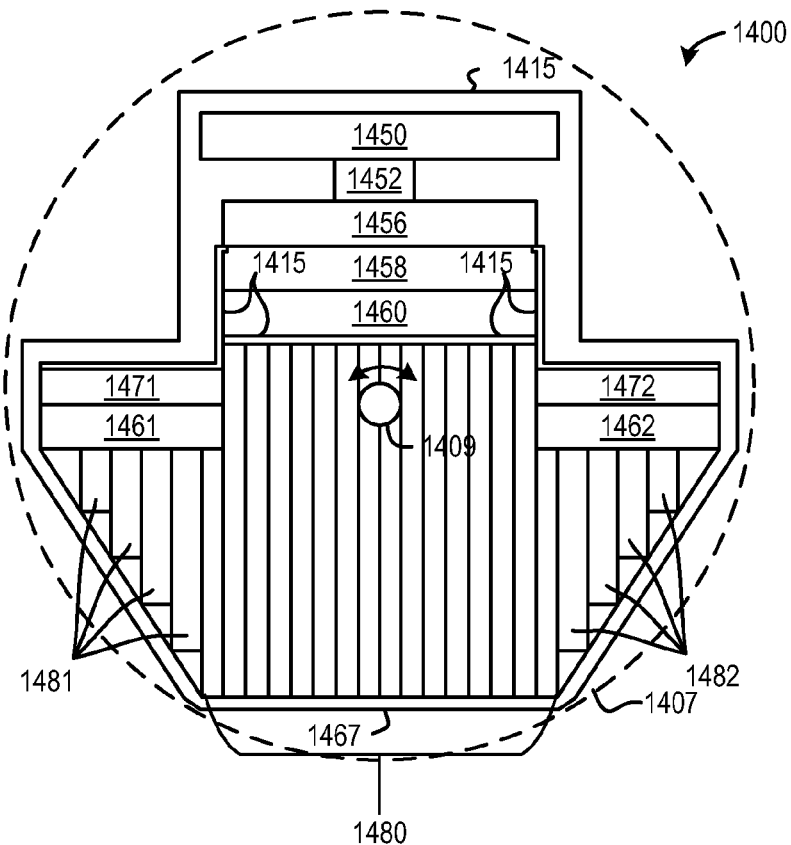
FIG. 14 is a cross-sectional view of a detector unit with a parallel collimator and variable collimators.

An imaging system, such as the imaging system depicted in FIG. 1, may include systems for controlling the movement of a plurality of imaging detectors to position the imaging detectors to acquire image data. For example, in various embodiments a Nuclear Medicine (NM) imaging system with an array of detector heads that are individually and independently movable is provided, as depicted in FIG. 2. In some embodiments, one or more of the heads are capable of a plurality of types of movement, such as rotation and linear motion. For example, the detector heads may be configured to be positioned adjacent or proximate a subject and rotated, such as to increase the field of view of the detector heads. Known detector heads, such as the detector unit depicted in FIG. 3, include a parallel collimator and are therefore rectangular in shape. The rotation of the detector head limits the proximity of neighboring detector heads, thereby requiring gaps between the detector heads, thus reducing the sensitivity of the imaging system. To increase the sensitivity of the imaging system, the gaps may be filled with single-dimensional pinhole arrays, as illustrated in FIGS. 4-10. These single-dimensional pinhole arrays may replace the parallel collimator in some examples, as shown in FIGS. 11-13. Further, instead of filling the gaps with a single-dimensional pinhole array, the parallel collimator may be adjusted, e.g., additional collimator holes with varying path lengths added, to increase the area that can be imaged by each detector head, as shown in FIG. 14. The imaging system illustrated in FIG. 1 may be configured to adjust one or more of the detector heads illustrated in the previously described figures according to the method illustrated in FIG. 15.

FIG. 1 is a schematic illustration of a NM imaging system 100 having a plurality of imaging detectors mounted on a gantry. The imaging detectors may be configured to rotate around a fixed pivot. The movement of the imaging detectors is controlled to reduce the likelihood or avoid collision among the moving imaging detectors and/or reduce the likelihood of one imaging detector obstructing the field of view of another imaging detector. For example, the NM imaging system in some embodiments provides coordinated swinging or rotating motion of a plurality of imaging detectors or detector heads.

In particular, a plurality of imaging detectors 102 are mounted to a gantry 104 and/or a patient support structure 124 (e.g., within the patient support structure 124 under a patient table 120), which may define a table support for a patient table 120. In the illustrated embodiment, the imaging detectors 102 are configured as two separate detector arrays 106 and 108 positioned above and below the subject 110 (e.g., a patient), as viewed in FIG. 1. The detector arrays 106 and 108 may be coupled directly to the gantry 104 and/or patient support structure 124, or may be coupled via support members 112 thereto, to allow movement of the entire arrays 106 and/or 108 relative to the gantry 104 (e.g. translating movement in the left or right direction as viewed in FIG. 1) or the patient support structure 124 (e.g., swinging or rotating movement under the subject 110). Additionally, each of the imaging detectors 102 includes a detector unit 114, at least some of which are mounted to a movable detector carrier 116 (e.g., a support arm or actuator that may be driven by a motor to cause movement thereof) that extends from the gantry 104 or within the patient support structure 124. In some embodiments, the detector carriers 116 allow movement of the detector units 114 towards and away from the subject 110, such as linearly. Thus, in the illustrated embodiment the detector arrays 106 and 108 are mounted above and below the subject 110 and may allow linear movement of the detector units 114 (indicated by the arrow L), such as generally parallel to the patient table 120 in one embodiment. However, other configurations and orientations are possible as described herein, as well as different types of movements (e.g., transverse or perpendicular movement relative to the patient table 120). It should be noted that the movable detector carrier 116 may be any type of support that allows movement of the detector units 114 relative to the support member 112, gantry 104, and/or patient support structure 124, which in various embodiments allows the detector units 114 to move linearly towards and away from the support member 112, such as radially inward and outwards for positioning adjacent the subject 110. For example, as described herein, the detector units 114 may be controlled to move independently of each other towards or away from the subject 110, as well as capable or rotational, pivoting, or tilting movement in some embodiments.

Each of the imaging detectors 102 in various embodiments is smaller than a conventional whole body or general purpose imaging detector. A conventional imaging detector may be large enough to image most or all of a width of a patient's body at one time and may have a diameter of approximately 50 cm or more. In contrast, each of the imaging detectors 102 may include one or more detector units 114 coupled to a respective detector carrier 116 and having dimensions of 4 cm to 20 cm and may be formed of Cadmium Zinc Telluride (CZT) tiles or modules. For example, each of the detector units 114 may be 8×8 cm in size and be composed of a plurality of CZT pixelated modules (not shown). For example, each module may be 4×4 cm in size and have 16×16=256 pixels. In some embodiments, each detector unit 114 includes a plurality of modules, such as an array of 1×7 modules. However, different configurations and array sizes are contemplated including, for example, detector units 114 having multiple rows of modules.

It should be understood that the imaging detectors 102 may be different sizes and/or shapes with respect to each other, such as square, rectangular, circular or other shape. An actual field of view (FOV) of each of the imaging detectors 102 may be directly proportional to the size and shape of the respective imaging detector.

The gantry 104 may be formed with an aperture 118 (e.g., opening or bore) therethrough as illustrated. The patient table 120 is configured with a support mechanism, such as the patient support structure 124, to support and carry the subject 110 in one or more of a plurality of viewing positions within the aperture 118 and relative to the imaging detectors 102. Alternatively, the gantry 104 may comprise a plurality of gantry segments (not shown), each of which may independently move a support member 112 or one or more of the imaging detectors 102.

The gantry 104 may also be configured in other shapes, such as a "C", "H" and "L", for example, and may be rotatable about the subject 110. For example, the gantry 104 may be formed as a closed ring or circle, or as an open arc or arch which allows the subject 110 to be easily accessed while imaging and facilitates loading and unloading of the subject 110, as well as reducing claustrophobia in some subjects 110. For example, in some embodiments the gantry 104 may be arc shaped and the support members 112 movable along the arc to position the detector units 114 at different locations along the gantry 104. In some embodiments, the detector units 114 may also be independently movable along the gantry 104.

Additional imaging detectors (not shown) may be positioned to form rows of detector arrays or an arc or ring around the subject 110. By positioning multiple imaging detectors 102 at multiple positions with respect to the subject 110, such as along an imaging axis (e.g., head to toe direction of the subject 110) image data specific for a larger FOV may be acquired more quickly.

Each of the imaging detectors 102 has a radiation detection face, which is directed towards the subject 110 or a region of interest within the subject. The radiation detection faces may be covered by or have coupled thereto a collimator 122. The actual FOV for each of the imaging detectors 102 may be increased, decreased, or relatively unchanged by the type of collimator 122. In one embodiment, the collimator 122 is a multi-bore collimator, such as a parallel-hole collimator. However, other types of collimators, such as converging or diverging collimators may optionally or alternatively be used. Other examples for the collimator 122 include pinhole, parallel-beam converging, diverging fan-beam, converging or diverging cone-beam, multi-bore converging, multi-bore converging fan-beam, multi-bore converging cone-beam, multi-bore diverging, or other types of collimator. Additional detail regarding the imaging detector and collimator configuration will be presented below with respect to FIGS. 2-15.

Optionally, multi-bore collimators may be constructed to be registered with pixels of the detector units 114, which in one embodiment are CZT detectors. However, other materials may be used. Registered collimation may improve spatial resolution by forcing photons going through one bore to be collected primarily by one pixel. Additionally, registered collimation may improve sensitivity and energy response of pixelated detectors as detector area near the edges of a pixel or in between two adjacent pixels may have reduced sensitivity or decreased energy resolution or other performance degradation. Having collimator septa directly above the edges of pixels reduces the chance of a photon impinging at these degraded performance locations, without decreasing the overall probability of a photon passing through the collimator.

A controller unit 130 may control the movement and positioning of the patient table 120, imaging detectors 102, gantry 104 and/or the collimators 122. A range of motion before or during an acquisition, or between different image acquisitions, is set to maintain the actual FOV of each of the imaging detectors 102 directed, for example, towards or "aimed at" a particular area or region of the subject 110 or along the entire subject 110.

The controller unit 130 may have a gantry motor controller 132, table controller 134, detector controller 136, pivot controller 138, and collimator controller 140. The controllers 130, 132, 134, 136, 138, 140 may be automatically commanded by a processing unit 150, manually controlled by an operator, or a combination thereof. The gantry motor controller 132 may move the imaging detectors 102 with respect to the subject 110, for example, individually, in segments or subsets, or simultaneously in a fixed relationship to one another. For example, in some embodiments, the gantry controller 132 may cause the imaging detectors 102 and/or one or more of the support members 112 to rotate about the subject 110, which may include motion of less than or up to 180 degrees (or more).

The table controller 134 may move the patient table 120 to position the subject 110 relative to the imaging detectors 102. The patient table 120 may be moved in up-down directions, in-out directions, and right-left directions, for example. The detector controller 136 may control movement of each of the imaging detectors 102 to move closer to and farther from a surface of the subject 110, such as by controlling translating movement of the detector carriers 116 linearly towards or away from the subject 110 (e.g., sliding or telescoping movement). Optionally, the detector controller 136 may control movement of the detector carriers 116 to allow coordinated move of the detector array 106 or 108. For example, the detector controller 136 may control lateral movement of the detector carriers 116 illustrated by the L arrow (and shown as left and right as viewed in FIG. 1).

The pivot controller 138 may control pivoting, rotating, or swinging movement of the detector units 114 at ends of the detector carriers 116, the detector units 114 under the patient support structure 124, and/or the detector carrier 116. For example, one or more of the detector units 114 or detector carriers 116 may be rotated or swung about at least one axis to view the subject 110 from a plurality of angular orientations. The collimator controller 140 may adjust a position of an adjustable collimator, such as a collimator with adjustable strips (or vanes) or adjustable pinhole(s).

It should be noted that motion of one or more imaging detectors 102 may be in directions other than strictly axially or radially, and optionally, motions in several motion directions may be used. Moreover, the motions of the imaging detectors 102 are coordinated in various embodiments as described herein. Therefore, the term "motion controller" may be used to indicate a collective name for all motion controllers. It should be noted that the various controllers may be combined, for example, the detector controller 136 and pivot controller 138 may be combined to provide the different movements described herein.

Prior to acquiring an image of the subject 110 or a portion of the subject 110, the imaging detectors 102, gantry 104, patient table 120 and/or collimators 122 may be adjusted as discussed in more detail herein, such as to first or initial imaging positions, as well as subsequent imaging positions. The imaging detectors 102 may each be positioned to image a portion of the subject 110. Alternatively, one or more of the imaging detectors 102 may not be used to acquire data, such as the imaging detectors 102 at ends of the detector arrays 106 and 108, which as illustrated in FIG. 1 are in a retracted position away from the subject 110 (in the detector array 106) Positioning may be accomplished manually by the operator and/or automatically, which may include using other images acquired before the current acquisition, such as by another imaging modality such as CT, MRI, X-Ray, PET or ultrasound. Additionally, the detector units 114 may be configured to acquire non-NM data, such as x-ray CT data.

After the imaging detectors 102, gantry 104, patient table 120, and/or collimators 122 are positioned, one or more images are acquired by one or more of the imaging detectors 102 being used, which may include pivoting or swinging motion of one or more of the detector units 114, which may pivot, rotate or swing to different degrees or between different ranges of angles. The image data acquired by each imaging detector 102 may be combined and reconstructed into a composite image, which may comprise two-dimensional (2D) images, a three-dimensional (3D) volume, or a 3D volume over time (4D).

In one embodiment, the imaging detectors 102, gantry 104, patient table 120, and/or collimators 122 remain stationary after being initially positioned. In another embodiment, an effective field of view for one or more of the imaging detectors may be increased by movement such as pivoting, rotating, or swinging one or more of the imaging detectors 102, rotating one or more of the detector arrays 106 and/or 108 with the gantry 110, adjusting one or more of the collimators 122, or moving the patient table 120.

In various embodiments, a data acquisition system (DAS) 160 receives electrical signal data produced by the imaging detectors 102 and converts this data into digital signals for subsequent processing. An image reconstruction device 162 and a data storage device 164 may be provided in addition to the processing unit 150. It should be noted that one or more functions related to one or more of data acquisition, motion control, data processing and image reconstruction may be accomplished through hardware, software and/or by shared processing resources, which may be located within or near the imaging system 100, or may be located remotely. Additionally, a user input device 166 may be provided to receive user inputs (e.g., control commands), as well as a display 168 for displaying images.

Additionally, a detector position controller 165 is also provided, which may be implemented in hardware, software, or a combination thereof. For example, as shown in FIG. 1, the detector position controller 165 may form part of or operate in connection with the processing unit 150. In some embodiments, the detector position controller 165 may be a module that operates to control the movement of the imaging detectors 102, including the detector units 114, such that coordinated or synchronized movement is provided as described herein. It should be noted that movement of a plurality of the imaging detectors 102 and/or detector units 114 may be performed at the same time (e.g., simultaneously or concurrently) or at different times (e.g., sequentially or step wise, such as back and forth between two detector units 114). It also should be understood that when referring to a detector head, such a detector head may include one or multiple detector modules.

In operation, and as shown, for example, in FIG. 2, one embodiment includes the detector array 106 positioned (e.g., mounted) under the patient table 120. As can be seen, a plurality of detector units 114a, 114b are positioned in adjacent arrangement, for example, along one or more rows under the patient table 120 (it should be noted that only a single row of detector units is shown). The detector units in some embodiments are aligned along one or more axes generally perpendicular to the longitudinal axis of the patient table 120, which defines an examination axis (e.g., from head to toe of the subject 110). However, it should be appreciated that the detector units may be aligned in different configurations and orientations, which may be offset from each other, transverse to the longitudinal axis of the patient table 120 and/or parallel to the longitudinal axis of the patient table 120. The detector units illustrated in FIG. 2 may each be non-limiting examples of detector unit 114 of FIG. 1. Further, detector units 114a illustrated in FIG. 2 are arranged at an angle relative to a longitudinal axis of the detector units (which is perpendicular to a longitudinal axis of the patient table) and detector units 114b illustrated in FIG. 2 are arranged parallel to the longitudinal axis of the detector units.

As can be seen in the illustrated embodiment, each of the detector units 114a, 114b includes a housing 170, which are illustrated as circular. However, the housing 170 of the detector units 114a, 114b may have different shapes and sizes, for example, oval, other curved shapes, etc. The detector units 114a, 114b include within the housing 170 a detector support 172, which may be a frame or other support structure. A detector 174 is coupled to the detector support 172. For example, the detector 174 may include one or more CZT tiles or modules as described herein, which are connected to electronics 176 (e.g., output electronics to output detected events) therein. Additionally, the collimator 122 is mounted to a front detecting surface of the detector 174. Thus, the detector support 172 is sized and shaped, such as having a base and/or walls, to support and maintain the components of the detector unit 114a, 114b within the housing 170. For example, the components of the detector unit 114a, 114b are maintained within the housing 170 when the housing rotates, pivots, or swings as described in more detail herein. In the illustrated embodiment, the detector units 114a are shown in a rotated, pivoted, or swung position, while the detector units 114b are shown in a non-rotated, non-pivoted, or non-swung position. As can be seen, in the non-rotated, non-pivoted, or non-swung position, the detecting face of the detector is generally parallel to the patient support surface of the patient table 120, while in the rotated, pivoted, or swung position, the detecting face of the detector is not parallel to the patient support surface of the patient table 120. Various embodiments provide coordinated or synchronized movement of the detector units 114a, 114b, which allows the detector units 114a, 114b to be positioned or packed in closer alignment than in conventional systems. For example, in some embodiments, different detector units 114a, 114b, such as adjacent detector units 114 may move along different angular ranges, to a different angular position, and/or at different velocities.

It should be noted that the arrangement of detector units 114 in the detector array 106 may be provided in other portions of the NM imaging system 100, such as at positions along the gantry 104 or as part of the detector array 106. Also, it should be noted that in some embodiments, a housing 170 is not provided surrounding or encasing the components within the detector units 114. For example, the detector units 114 may be located and housed within the patient support structure 124 such that the patient support structure 124 provides protection from environmental elements.

As seen in FIG. 2, the housings 170 for detector units 114 are generally circular in shape and lie in close proximity to each other. As such, rotation of each detector unit 114 about its individual axis does not physically interfere with the adjacent detector units. The circular housings 170 allow for a small clearance in between each detector unit 114 to allow for complete rotation of each detector unit during operation of the imaging system 100.

Figure 3:
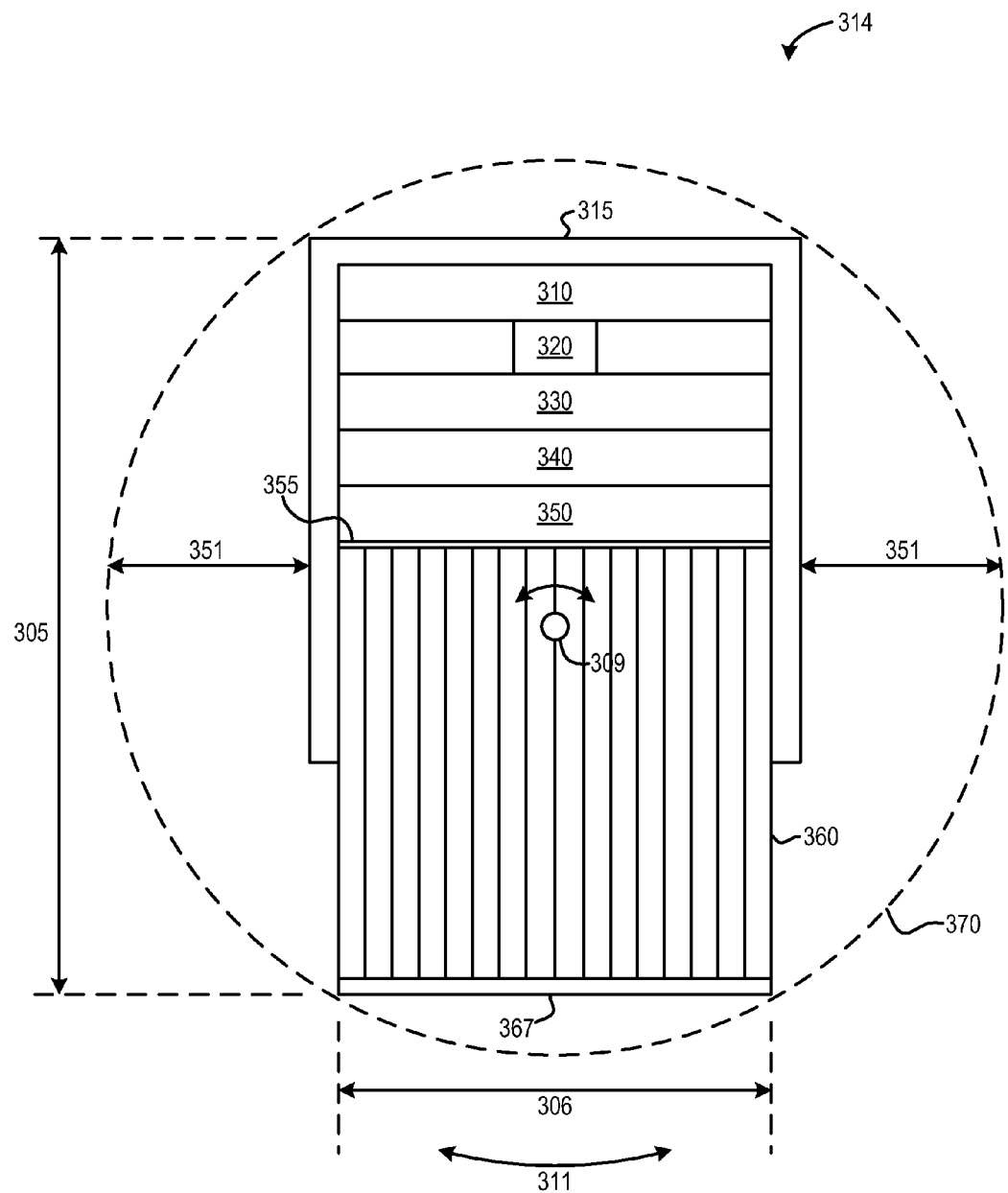
FIG. 3 is a cross-sectional view of a detector unit with a parallel collimator.

FIG. 3 shows a detailed view of detector unit 314, which may be similar to or substantially the same as detector unit 114 (including units 114*a* and 114*b*) shown in FIG. 2. As shown, the detecting unit is generally rectangular in shape, with a length 305 from a top of the detector to a bottom of the detector and a width 306 from a first side to a second side of the detector. Furthermore, the detector unit 314 rotates about a central axis 309, represented as a circular feature in FIG. 3. When an external actuator provides a torque to the detector unit 314, the unit may rotate about central axis 309 in the rotational directions shown by arrows 311. A shielding 315 provides protection of internal components as well as structural support for the internal components. The shielding 315 may also aid in reducing the amount of erroneous radiation emitted from the detector unit 314 when the imaging system 100 utilizes radiation such as x-rays or gamma rays. Furthermore, shielding 315 may provide electric insulation between the internal components and the surrounding housing 370 and adjacent detector units.

A heat sink 310 is attached directly to the shielding 315, wherein the heat sink draws heat away from other adjacent internal components via conductive heat transfer. The heat sink 310 may act as a safeguard for reducing the chance of overheating and subsequent damage of the other internal components. A cold-finger 320 is in turn attached to heat sink 310, wherein the cold-finger is smaller than the heat sink. A digital readout board (DRB) 330 is located adjacent to the cold-finger 320, and an analog front-end (AFE) 340 is attached to the DRB along a shared interface. The AFE 340 may include analog signal manipulating circuitry that utilizes devices such as filters, amplifiers, and other electronic circuits. The AFE 340 is directly coupled to a cadmium zinc telluride (CZT) semiconductor-detector 350, which includes compounds and/or alloys of cadmium, zinc, and tellurium for detecting emitted radiation such as x-rays and gamma rays. The CZT detector 350 may include a tiled, modular, and/or pixelated wafer manufactured in a number of thicknesses for the desired sensitivity of the detector to radiative waves. For example, the CZT detector 350 may be 5 mm thick or 7.5 mm thick. Generally, thicker detectors have a higher absorption rate; in particular, the 7.5 mm detector may absorb 8% more radiation than the 5 mm detector. Furthermore, due to the higher stopping power of the 7.5 mm detector, the 7.5 mm detector may also have an 80% sensitivity compared to the 60% sensitivity of the 5 mm detector. The detector sensitivity may be defined as the ratio between the numbers of events measured within an energy window of +/−6.5% around the energy peak of the detector spectrum divided by the total number of events measured in the detector spectrum.

An insulating layer 355 is positioned in between the CZT detector 350 and a parallel collimator 360. In some examples, the parallel collimator 360 is a structural piece that comprises a plurality of parallel chambers that directs radiation from outside the detector unit 314 towards the CZT detector 350. The collimator may be comprised of a suitable material, such as a material that strongly absorbs radiation (e.g., lead, tungsten, or other suitable material). The collimator 360 may aid in narrowing incoming radiation waves and cause the waves to move more parallel along the lengthwise direction 305. As such, the parallel collimator 360 may be of a larger length along lengthwise direction 305 than the other internal components such as CZT detector 350 and AFE 340. The central axis 309 may pass through the parallel collimator 360, as seen in FIG. 3. An end cap 367 may be placed on an end of the collimator 360 opposite to the end the insulating layer 355 is attached to. The end cap is thin and may be manufactured from low radiation-absorption metal such as aluminum and may or may not contain a patterned opening for freely allowing radiation waves to pass from outside the detector unit 314, through collimator 360, and to the CZT detector 350. Further, the width of the CZT detector 350 may be equal to a width of the collimator 360, and hence the width of the CZT detector may be equal to an aperture width of the detector unit (for example, the width of the CZT detector and the width of the aperture may both be substantially similar to width 306).

As seen, as the detector unit 314 rotates about central axis 309 in rotational directions along arrows 311, the unit may be confined by the housing 370 defining a circle. In some embodiments, housing 370 is omitted while it is understood the detector unit 314 sweeps the area inside a circle corresponding to the housing (as such, the housing 370 may otherwise be referred to as circle 370) as it rotates during operation of the imaging system. Although a cross-sectional view is shown in FIG. 3 as well as in subsequent figures, it is understood that the detector unit 314 is a three-dimensional object that may rotate in three-dimensional space such that circle 370 becomes a three-dimensional sphere in which the detector unit rotates about central axis 309 and/or additional axes such as axis that is oriented normal to axis 309 (not shown).

Since the detector unit 314 can sweep through the area defined by circle 370, to accommodate adjacent detector units without collision of the detector units when the detector units are rotated, unused volume 351 is present between the shielding 315, parallel collimator 360, and circle 370. The inventors herein have recognized that the unused volume 351 may be better utilized by additional components for increasing the effectiveness of the detector unit 314. In particular, as described further herein below, one or more single-dimension pinhole arrays (SDPA) may be added to detector unit 314.

Figure 4:
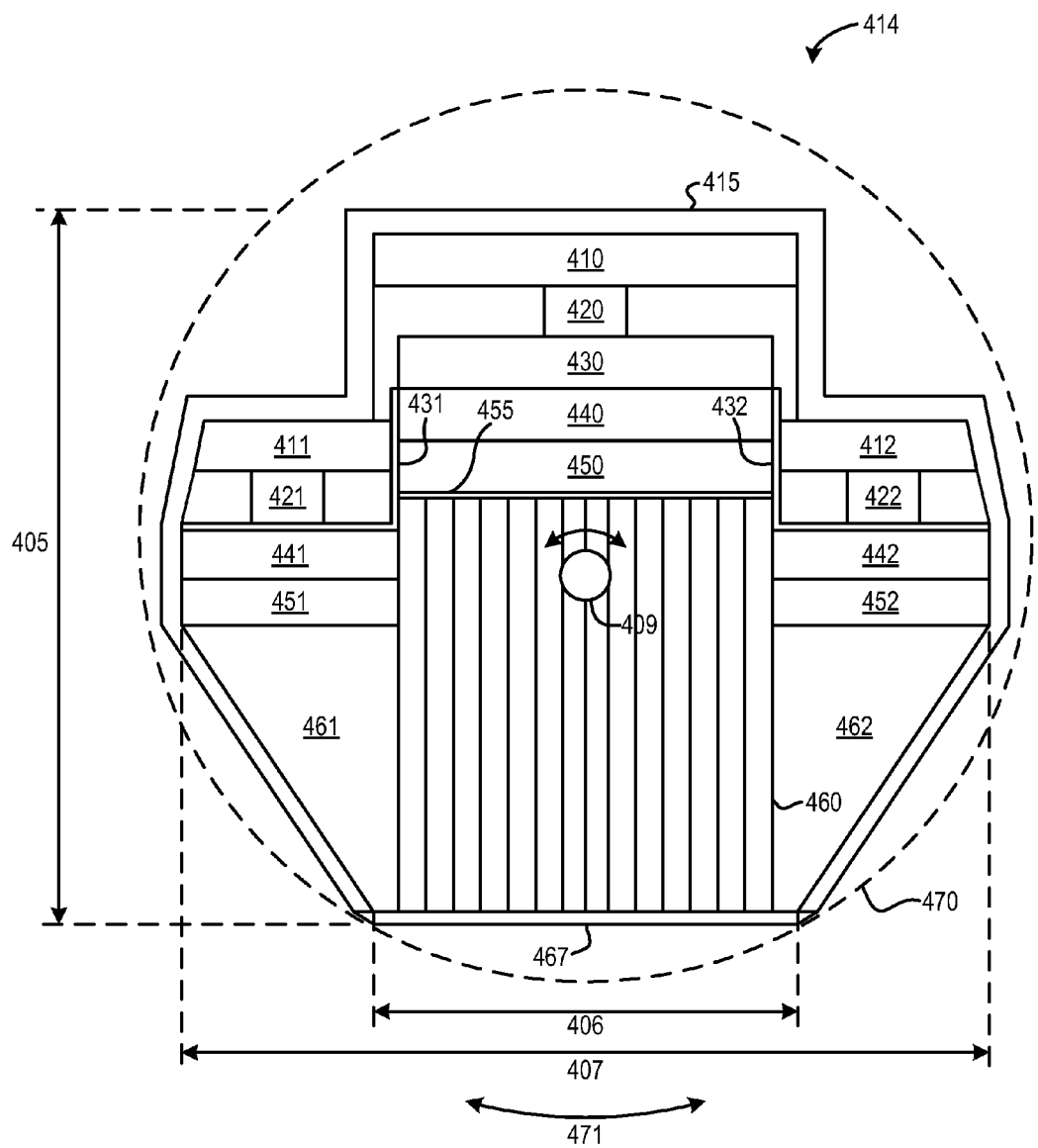
FIG. 4 is a cross-sectional view of a detector unit with independent heat sinks for a parallel collimator and two single-dimensional pinhole arrays.

FIG. 4 shows a head-on cross-sectional view of an example detector unit 414 in accordance with the current disclosure. In particular, detector unit 414 is similar to the detector unit 314 described hereinabove with regard to FIG. 3 but with the addition of a pair of SDPAs 461 and 462. Detector unit 414 will be described herein with reference to the systems and components depicted in FIGS. 1 and 2, though it should be understood that the detector unit may be applied to other systems without departing from the scope of this disclosure. For example, detector unit 414 may be included in an imaging system 100 as detector unit 114 shown in FIGS. 1 and 2.

SPDA 461 and SPDA 462 partially fill the volume 351 unused by detector unit 314. The right trapezoidal form of the SDPAs enables an enlarged detector surface area while maintaining the same or substantially same aperture as detector unit 314. In particular, detector unit 414 has an aperture width 406 and a detector width 407, where the detector width 407 is greater than the aperture width 406, while the aperture width and detector width of detector unit 314 are similar and equal to aperture width 406. In this way, detector unit 414 includes a larger detector area than detector unit 314 and therefore has increased sensitivity. In particular, the pair of SDPAs 461 and 462 increases the sensitivity of detector unit 414 by a factor of 157% and 118% in comparison to a detector unit 314 with CZT depths of 5 mm and 7.5 mm, respectively, where the rotational volume 470 of detector unit 414 and the rotational volume 370 of detector unit 314 are the same.

As shown, the detecting unit is non-rectangular in shape, with a length 405 and a width 407. Furthermore, the detector unit 414 rotates about a central axis 409, represented as a circular feature in FIG. 4. When an external actuator provides a torque to the detector unit 414, the unit may rotate about central axis 409 in the rotational direction shown by arrows 471. A shielding 415 provides radiation shielding, protection of internal components as well as structural support for the internal components. The shielding 415 may also aid in reducing the amount of erroneous radiation emitted from the detector unit 414 when the imaging system 100 utilizes radiation such as x-rays or gamma rays. Furthermore, shielding 415 may provide electric insulation between the internal components and the surrounding housing 470 and adjacent detector units.

Detector unit 414 comprises a modified version of detector unit 314, and therefore includes a central detector with the same components of detector unit 314: a heat sink 410 attached directly to a shielding 415, wherein the heat sink draws heat away from other adjacent internal components via conductive heat transfer and thus acts as a safeguard for reducing the chance of overheating and subsequent damage of the other internal components; a cold-finger 420 attached to heat sink 410, wherein the cold-finger is smaller than the heat sink; a digital readout board (DRB) 430 located adjacent to the cold-finger 420; an analog front-end (AFE) 440 attached to the DRB along a shared interface, which may include analog signal manipulating circuitry that utilizes devices such as filters, amplifiers, and other electronic circuits; a CZT semiconductor-detector 450, coupled directly to AFE 440, which includes compounds and/or alloys of cadmium, zinc, and tellurium for detecting emitted radiation such as x-rays and gamma rays and which may include a wafer manufactured in a number of thicknesses for the desired sensitivity of the detector to radiative waves; and an insulating layer 455 positioned in between the CZT detector 450 and a parallel collimator 460, where, in some examples, the parallel collimator 460 is a structural piece that comprises a plurality of parallel chambers that directs radiation from outside the detector unit 414 towards the CZT detector 450. The collimator 460 may aid in narrowing incoming radiation waves and cause the waves to move more parallel along the lengthwise direction 405. As such, the parallel collimator 460 may be of a larger length along lengthwise direction 405 than the other internal components such as CZT detector 450 and AFE 440. The central axis 409 may pass through the parallel collimator 460, as seen in FIG. 4. An end cap 467 may be placed on an end of the collimator 460 opposite to the end the insulating layer 455 is attached to. The end cap may be manufactured from a metal having low radiation-absorption, such as aluminum, and may or may not contain a patterned opening for freely allowing radiation waves to pass from outside the detector unit 414, through collimator 460, and to the CZT detector 450.

In addition to the central detector components, detector unit 414 includes an SDPA 461 and 462 on each side of the parallel collimator 460. The total volume of each SDPA comprises a right trapezoidal prism. Thus the shape of each SDPA 461 and 462 as seen from a head-on view, such as shown in FIG. 4, is a right trapezoid.

Detector unit 414 includes a set of detector electronics and a heat sink corresponding to each SDPA. For example, detector unit 414 includes: a heat sink 411 attached to a cold finger 421, wherein the cold finger 421 is smaller than the heat sink 411; an AFE 441 electrically connected to the DRB 430 via flexible printed board (Flex) 431. As can be seen from FIG. 4, DRB 430 is electrically and functionally connected to both AFE 440 and AFE 441 and processes the electrical signals received from both of AFEs. As previously mentioned, DRB 430 may include analog signal manipulating circuitry that utilizes devices such as filters, amplifiers, and other electronic circuits; and a CZT detector 451, coupled directly to AFE 441. The CZT detector 451 may be attached directly to SDPA 461. In some examples, detector unit may further include an insulating layer (not shown), similar to the insulating layer 455, positioned between CZT detector 451 and SDPA 461. Similar to the layers attached to SDPA 461, detector unit 414 further includes a heat sink 412, cold finger 422, AFE 442, and CZT 452 attached in layers to SDPA 462 as shown in FIG. 4. Further, DRB 430 may be electrically connected by Flexes 431, and 432 to AFEs 441 and 442, respectively, to provide a single output of all data collected by CZT detectors 450, 451, and 452.

Detector unit 414 swivels, or rotates, about axis 409 in a clockwise or counter-clockwise, or rotational, direction. During a scanning session, the rotational direction may comprise a scanning direction. Radiation from a point source, for example, enters detector unit 414 through the end cap 467 and enters the collimator 460 and the SDPAs 461 and 462. As the detector unit 414 rotates, radiation from the point source entering an SDPA is directed to each pixel of the SDPA.

As will be explained in more detail below, each SDPA includes a plurality of pinholes arranged along a single dimension. In contrast to the parallel collimator, each pinhole of the SDPA directs radiation to more than one pixel of the detector (e.g., the CZT detector). For example, each pinhole may direct radiation to three pixels of the detector.

Figure 5:
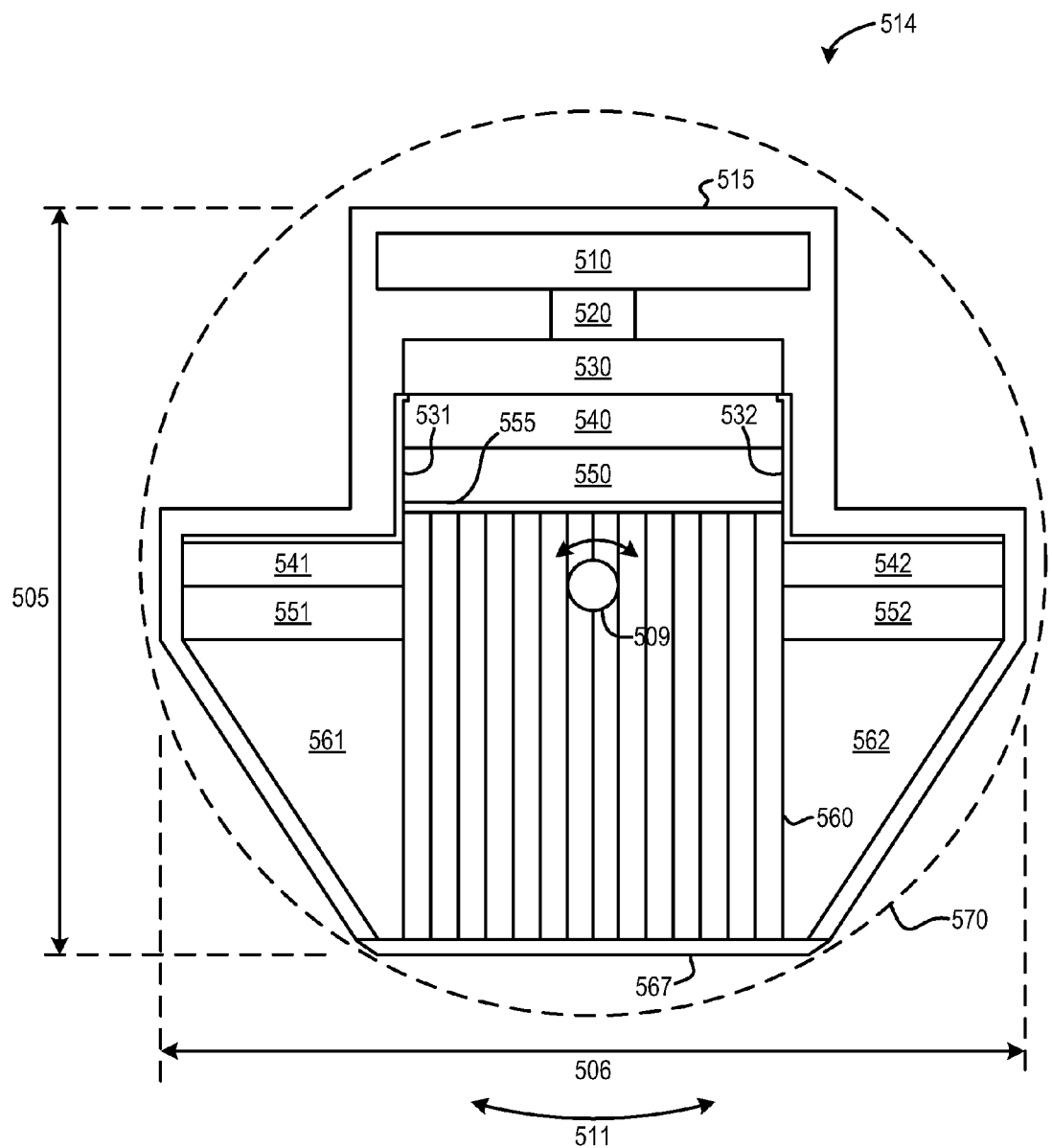
FIG. 5 is a cross-sectional view of a detector unit with a common heat sink for a parallel collimator and two single-dimensional pinhole arrays.

FIG. 5 shows a head-on cross-sectional view of an example detector unit 514 in accordance with the current disclosure. In particular, detector unit 514 is similar to the detector unit 414 described hereinabove with regard to FIG. 4, including a heat sink 510 attached directly to a shielding 515, a cold-finger 520 attached to heat sink 510, wherein the cold-finger is smaller than the heat sink, a DRB 530 located adjacent to the cold-finger 520; an AFE 540 attached to the DRB 530 along a shared interface, which may include analog signal manipulating circuitry that utilizes devices such as filters, amplifiers, and other electronic circuits; a CZT semiconductor-detector 550, coupled directly to AFE 540, which includes compounds and/or alloys of cadmium, zinc, and tellurium for detecting emitted radiation such as x-rays and gamma rays and which may include a wafer manufactured in a number of thicknesses for the desired sensitivity of the detector to radiative waves, and an insulating layer 555 positioned in between the CZT detector 550 and a parallel collimator 560 that comprises a plurality of parallel chambers that directs radiation from outside the detector unit 514 towards the CZT detector 550.

SPDAs 561 and 562 are substantially similar to SDPAs 461 and 462, however SDPAs 561 and 562 share a common heat sink 510 with parallel collimator 560 via the radiation shielding 515. Shielding 515 of detector unit 514 may be thicker than shielding 415 of detector unit 414 to improve heat flow to heat sink 510. Specifically, SPDA 561 is positioned under CZT detector 551, which is attached to AFE 541 that is electrically connected to DRB 530 via Flex 531. DRB 530 may include analog signal manipulating circuitry that utilizes devices such as filters, amplifiers, and other electronic circuits. The CZT semiconductor-detector 551 is coupled directly to AFE 540. The CZT detector 551 may be attached directly to SDPA 561. Alternatively, an insulation layer may be inserted in the interface between detector 551 and SPDA 561. Likewise, SPDA 562 is positioned under CZT detector 552, which is attached to AFE 542 that is electrically connected to DRB 530 via Flex 532. The CZT detector 552 is coupled directly to AFE 540. The CZT detector 552 may be attached directly to SDPA 562. Alternatively, an insulation layer may be inserted in the interface between detector 552 and SPDA 562.

Similar to detector unit 414, detector unit 514 may include a housing 570 and a rotational axis 509, have a length 505 and a width 506 (which may be similar to length 405 and width 406), and be rotatable in the direction shown by arrows 511. Thus, an improved swivel detector module with a common heat sink is provided. In particular, the radiation shielding is used as part of the heat sink.

Figure 6:
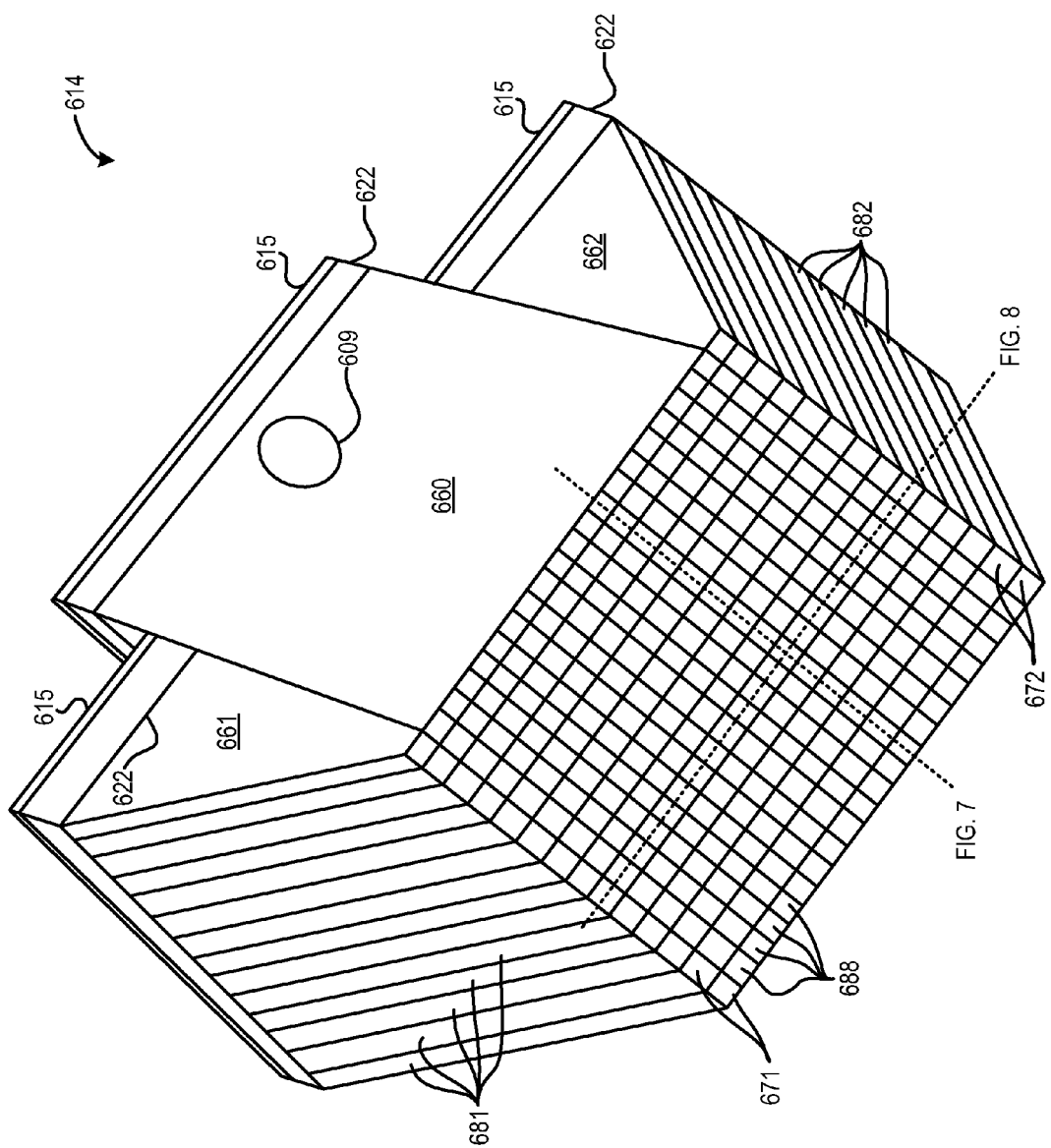
FIG. 6 is a perspective view of a detector unit with a parallel collimator and two single-dimensional pinhole arrays.

FIG. 6 shows a perspective view of an example detector unit 614 including a parallel collimator 660 and two SDPAs 661 and 662. Detector unit 614 may be one non-limiting example of detector unit 414 or detector unit 514, and include a rotational axis 609, shielding 615, and associated components 622 interposed between the shielding 615 and parallel collimator and two SDPAs 661 and 662, including a CZT detector, AFE, DRB, heat sink, etc.

Parallel collimator 660 includes a plurality of interleaved dividers that creates a grid of parallel holes 688. Each hole 688 (also referred to as bores) is aligned with a respective pixel of the CZT detector. Radiation enters through each hole 688 and is directed by the respective hole 688 to the CZT detector. As shown, parallel collimator 660 includes a grid of 19×14 holes of equal diameter. However, other configurations are possible, such as a grid of 16×16 or 14×16.

A first SDPA 661 is located on one side of the parallel collimator 660. First SDPA 661 includes a plurality of pinholes 671 arranged in a single dimension (e.g., along a line) adjacent to the outside of the grid of holes of the parallel collimator. Each pinhole is open to a respective chamber 681 that is coupled to a plurality of pixels of the CZT detector. As illustrated, first SDPA 661 includes 14 pinholes arranged in a line that is perpendicular to a longitudinal axis of the detector unit 614. The pixels of the CZT detector that receive the radiation from a respective pinhole are arranged along a line parallel to the longitudinal axis of the detector unit 614.

A second SDPA 662 is located on the other side of the parallel collimator 660. Second SDPA 662 includes a plurality of pinholes 672 arranged in a single dimension (e.g., along a line) adjacent to the outside of the grid of holes of the parallel collimator. Each pinhole is open to a respective chamber 682 that is coupled to a plurality of pixels of the CZT detector. As illustrated, second SDPA 662 includes 14 pinholes arranged in a line that is perpendicular to a longitudinal axis of the detector unit 614. The pixels of the CZT detector that receive the radiation from a respective pinhole are arranged along a line parallel to the longitudinal axis of the detector unit 614.

Figure 8:
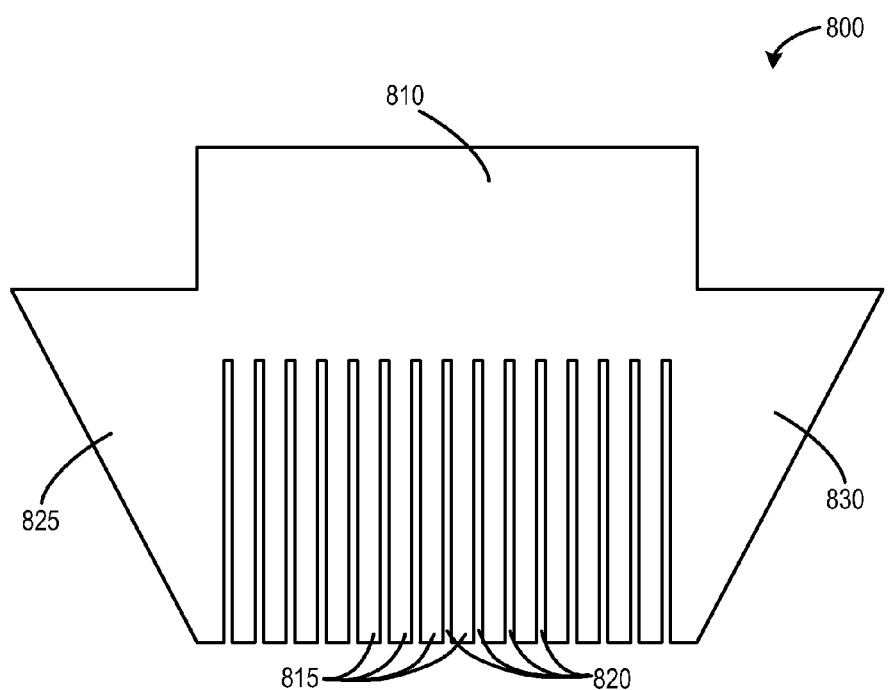

Chambers 681 and 682 of SDPA 661 and 662, respectively, include dividers, such as dividers 810 of FIG. 8 having a trapezoidal-like shape to allow radiation received via each of the openings 671 and 672 of SPDA 661 and 662, respectively, to arrive onto multiple pixels of the CZT detector arranged along the longitudinal axis of detector unit 614. In the other dimension-orientation along a direction normal to the longitudinal axis of unit 614 and parallel to swiveling axis 609, the radiation that enters via each of the openings 671 and 672 is collimated by dividers, such as dividers 810 of FIG. 8, to be collected by a single pixel. Thus, each of SPDA 661 and 662 may be defined as a radiation collimation unit that collects radiation via an array of multiple openings, which in a first dimension collimates the radiation received by the openings similar to a parallel-holes collimator and in a second dimension normal to the first dimension collects the radiation from the openings similar to a pinhole collimator.

The sensitivity of each SDPA may be substantially similar to the sensitivity of the parallel collimator, as explained below. Briefly, during scanning, the detector unit may rotate, swivel, or otherwise move in order to sweep across a target region. During the scanning, a given hole of the parallel collimator may direct radiation to only one pixel of the CZT detector, and the radiation absorbed by the detector processed to represent a field of view of that collimator hole. The fields of view of adjacent pixels in the detector that receives radiation via the parallel collimator partially overlap each other. Each field of view scans along the entire scanning path. The total radiation-collection is equal to the sum of the radiation collection of all the pixels via their field of view along the whole scanning path.

In the lateral direction (non-scanning direction) the parallel collimator and the SDPAs are identical. That is, the adjacent pixels of the SDPA in the lateral direction (e.g., the same dimension that the pinholes are arranged) have overlapping fields of view, similar to the parallel collimator. Along the scanning direction, however, the SDPA is different from the parallel collimator in that the fields of view of adjacent pixels in the SDPA may be separated. Each field of view scans along the entire scanning path, and the total radiation-collection is equal to the sum of the radiation collection of all the pixels via their field of view along the whole scanning path. As such, as scanning progresses, each pixel (whether coupled to a parallel collimator or SDPA) ultimately receives the same amount of radiation along the entire scanning path. For both area and point source scanning, the sensitivity of the SDPA and the parallel collimator is approximately the same. The detector area of a detector unit including SPDAs (such as detector unit 414) is larger than the area of detector unit not including SPDAs (such as detector unit 314) by a factor of 160%. Accordingly, detector unit 414 has a sensitivity that is larger by a factor of 157% and 118% respectively in comparison to the sensitivity of detector unit 314 with a 5 mm CZT and a 7.5 mm CZT.

Figure 7:
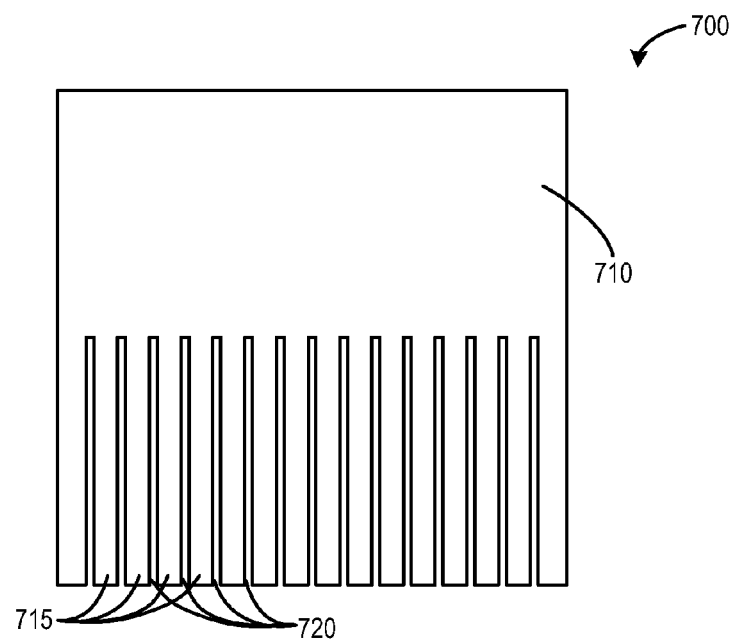

FIG. 7 shows a lateral projection 700 of a divider of a detector unit with a parallel collimator and two SDPAs, such as the detector unit 614 of FIG. 6. In particular, projection 700 includes a representative transversal divider 710 that partially defines the collimating bores. Transversal divider 710 includes a plurality of septa 715 with intervening spaces 720 between each respective septa 715. As shown, transversal divider 710 includes 15 spaces 720 and 16 septa 715; however, any suitable number of spaces is possible. To produce the grid of bores (such as the grid illustrated in FIG. 6), a plurality of transversal dividers 710 may be interleaved with a plurality of longitudinal dividers (shown in FIG. 8 and explained in more detail below). For example, 15 transversal dividers 710 may be arranged along a transverse axis of a detector unit to define together with 17 dividers 810 of FIG. 8 a central 16×14 grid of collimator bores.

FIG. 8 shows a head-on projection 800 of a detector unit with a parallel collimator and two SDPAs, such as detector unit 614 of FIG. 6. In particular, projection 800 shows a respective longitudinal divider 810 including a plurality of septa 815 and spaces 820. Similar to transversal divider 710, longitudinal divider 810 includes 15 spaces. Longitudinal divider 810 further includes a first trapezoidal area 825 and a second trapezoidal area 830. To produce the grid of bores (such as the grid illustrated in FIG. 6), a plurality of longitudinal dividers 810 may be interleaved with a plurality of transversal dividers (shown in FIG. 7). For example, 17 longitudinal dividers 810 may be arranged along a longitudinal axis of a detector unit to define together with 15 dividers 710 a central 16×14 grid of collimator bores, such as parallel-holes collimator 600 of FIG. 6 and two arrays of SPDA, such as SPDAs 661 and 662 of FIG. 6 that each of these SPDAs on each side of the parallel-holes collimator includes 16 openings. Additionally, by stacking the respective trapezoidal areas on top of each other along the longitudinal axis (with gaps between each divider), the plurality of chambers of the respective SDPAs, such as chambers 681 and 682 of FIG. 6, are created. The most outer dividers 810 that are attached perpendicularly to dividers 710 and serving as the side-walls of the central section of the parallel-holes collimator 660 of IFG. 6 and the sections of SPDAs 661 and 662 of FIG. 6 may not include spaces 820.

The total number of longitudinal and transversal dividers used for the combination of a parallel collimator with two SDPAs may be equal to the number of dividers used only for the parallel collimator. In this way, cost and complexity of production is similar to the parallel-collimator-only detector unit design. For example, if a parallel collimator of a conventional detector unit included a grid of 16×16 bores, corresponding to a grid of 16×16 detectors, a parallel collimator of a detector unit of the disclosure may include a grid of 14×16 bores. However, due to the fact that each opening of each chamber of each single-dimensional pinhole array directs radiation to more than one pixel, the detector unit of the disclosure may have an increased number of pixels over conventional detector units, such as 20×16 pixels, even while providing the same range of rotation and taking up the same amount of space and openings as conventional detector units.

Figure 9:
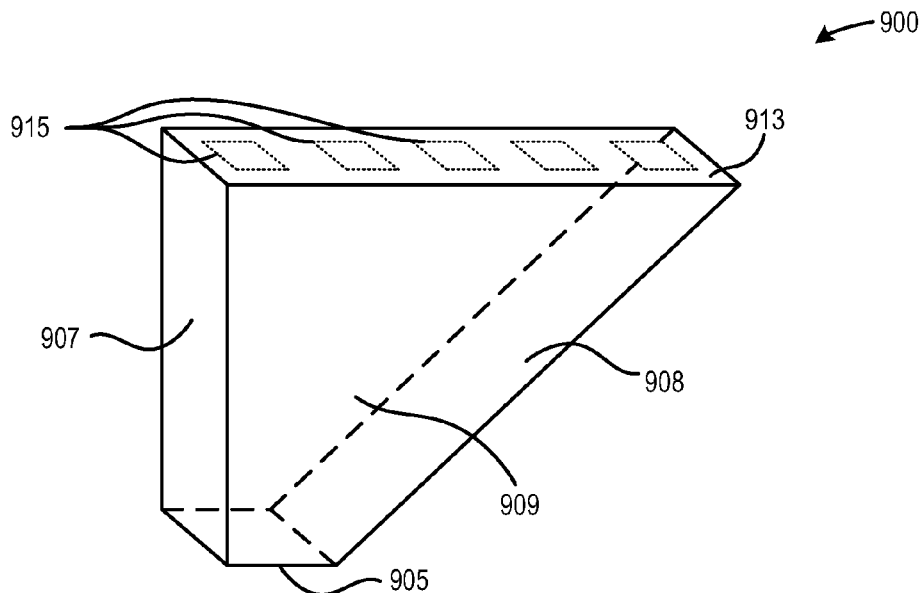
FIGS. 9-10 illustrate the components of a single-dimensional pinhole array.
Figure 10:
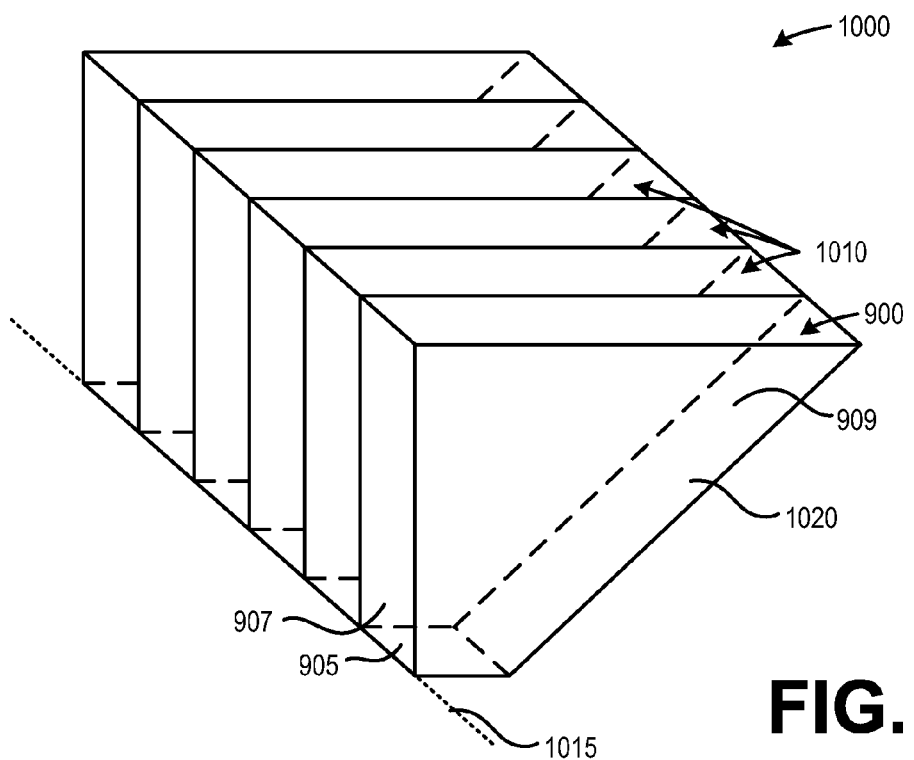

FIGS. 9-10 show various views of a single dimension pinhole array. In particular, one unit cell and a complete array are shown. FIG. 9 shows a unit cell 900 of a single-dimension pinhole array, comprising a pinhole 905 created when a first longitudinal divider trapezoidal area 907 is stacked with a second longitudinal divider trapezoidal area 909. The dividers are coupled to a CZT detector face 913 that comprises a plurality of pixels 915. The volume of unit cell 900 (e.g., a chamber) is confined by enclosure 908 (otherwise referred to as a side-wall) which prevents radiation from entering cell 900 other than via pinhole 905. Thus, when the two dividers and the CZT detector are aligned in the manner shown in FIG. 9, a unit cell of the pinhole array is created, wherein radiation or other energy passes through pinhole 905 and is directed through the resultant chamber to one or more of the pixels 915. While FIG. 9 illustrates five pixels, it is to be understood that a suitable number of pixels may be included in a unit cell of the SDPA, such as three pixels. Further, it is to be understood that the pixels that receive radioactivity from the parallel collimator do not overlap with the pixels that receive radioactivity from the SDPA. Additionally, the pixels that receive radioactivity from the SDPA are contained fully within the SDPA. While not shown in FIG. 9, it is be understood that additional portions of the dividers may be present, to create the parallel collimator as shown in FIGS. 7-8.

FIG. 10 shows a complete single-dimensional pinhole array 1000, comprised of multiple unit cells, including unit cell 900. A plurality of additional unit cells 1010, similar to unit cell 900 are included in array 1000 and aligned along a transverse axis 1015. The first longitudinal divider trapezoidal area 907 of unit cell 900 also acts as a longitudinal divider trapezoidal area of the adjacent unit cell 1010. Thus, a plurality of pinholes is created. While not shown in FIG. 10, it is to be understood that an outer wall (e.g., shielding) may be present in the area denoted by numeral 1020, to close off the chambers and pinholes.

In some embodiments, a detector unit may include one or more SDPAs but may not include a parallel collimator. For example, FIGS. 11-12 show example detector unit configurations including one or more SDPAs and no parallel collimator. Such configurations may provide simpler structures with lower cost for collimation. To create an SDPA-only detector unit, a plurality of longitudinal dividers may be stacked without interleaved transversal dividers. The longitudinal dividers may include no spaces, e.g., only be comprised of continuous, non-gapped material, where the chambers and/or pinholes are defined by the gaps between adjacent dividers and/or outer wall shieldings. Further, the SDPA may cover the entire detector, such that each pixel of the detector receives radiation from the SDPA. By using only an SDPA, an increased sensitivity of approximately 20%, for example, may be provided over using only a parallel collimator.

FIG. 11 shows a detector unit 1100 with a single SDPA 1161. Detector unit 1100 does not include a parallel collimator. All radiation passed to the CZT detector 1160 is passed through the SDPA 1161. The SPDA 1161 may be substantially similar to the array 1000 illustrated in FIG. 10, including a plurality of pinholes 1105 arranged along an axis. Instead of directing radiation to a few of the pixels of the detector, an entire row of pixels (e.g., 16) may be directed radiation via a single unit cell of the SDPA 1161. Full detection of all FOV of all pixels may be achieved upon scanning of the detector unit, as each pixel does not receive overlapping FOV (as in the parallel collimator) but instead each FOV may be separated.

The detector unit 1100 includes similar components as the detector unit 414, and may be included in the system of FIG. 1 and/or FIG. 2. Specifically, the detector unit 1100 includes a heat sink 1150 attached directly to a shielding 1115, a cold-finger 1152 attached to heat sink 1150, wherein the cold-finger is smaller than the heat sink, a DRB 1156 located adjacent to the cold-finger 1152; an AFE 1158 attached to the DRB along a shared interface, which may include analog signal manipulating circuitry that utilizes devices such as filters, amplifiers, and other electronic circuits; a CZT detector 1160, coupled directly to AFE 1158, which includes compounds and/or alloys of cadmium, zinc, and tellurium for detecting emitted radiation such as x-rays and gamma rays and which may include a wafer manufactured in a number of thicknesses for the desired sensitivity of the detector to radiative waves. The shielding 1115 may surround an entirety of the detector unit 1100, other than the pinhole openings. Detector unit 1100 also includes a rotational axis 1109 and rotates around a circumference defined by circle 1107.

FIG. 12 shows a detector unit 1200 with three SDPAs 1261, 1262, and 1263 where the pinholes 1205a, 1205b, and 1205c of each respective SDPA are adjacent to each other. The detector unit 1200 includes similar components as the detector unit 414, and may be included in the system of FIG. 1 and/or FIG. 2. Specifically, the detector unit 1200 includes a heat sink 1250 attached directly to a shielding 1215, a cold-finger 1252 attached to heat sink 1250, wherein the cold-finger is smaller than the heat sink, a DRB 1256 located adjacent to the cold-finger 1252; an AFE 1258 attached to the DRB along a shared interface, which may include analog signal manipulating circuitry that utilizes devices such as filters, amplifiers, and other electronic circuits; a CZT detector 1260, coupled directly to AFE 1258, which includes compounds and/or alloys of cadmium, zinc, and tellurium for detecting emitted radiation such as x-rays and gamma rays and which may include a wafer manufactured in a number of thicknesses for the desired sensitivity of the detector to radiative waves. The shielding 1215 may surround an entirety of the detector unit 1200, other than the pinhole openings. Detector unit 1200 also includes a rotational axis 1209 and rotates around a circumference defined by circle 1207. By including multiple SDPAs with adjacent apertures, side-angles may be reduced. For example, dividing the detector area into multiple SPDAs ensures that only part of the detector area is positioned above each SPDA. This configuration reduces the tilted angles α in which radiation from pinholes, such as pinholes 1205*a*, 1205*b* and 1205*c* arrive to the pixels of CZT detector 1260 located in the area above each of the SPDAs. The sensitivity of a pinhole is proportional to $[\cos(\alpha)]^3$ when the tilted angles α is defined as the angle between the propagation direction of the radiation received by a pixel of detector 1260 via the pinhole and a line normal to the plane of the CZT detector 1260. It can be seen that the sensitivity goes up with the reduction of the tilted angles α and these angles are reduced with the increase of the number of SPDAs used for each detector units. The number of SPDAs used in each detector units can be selected as desired.

FIG. 13 shows a detector unit 1300 with three SDPAs 1361, 1362, and 1363 with separate apertures. Specifically, SDPA 1363 includes aperture 1305*a*, SDPA 1361 includes aperture 1305*b*, and SDPA 1362 includes aperture 1305*c*. The view of FIG. 13 shows a cross-section of the detector unit 1300, and thus only a single aperture (e.g., pinhole) is shown for each SDPA; it is to be understood that a plurality of pinholes is present for each SPDA, along the transverse axis (e.g., parallel to the rotational axis). The detector unit 1300 includes similar components as the detector unit 414, and may be included in the system of FIG. 1 and/or FIG. 2. Specifically, the detector unit 1300 includes a heat sink 1350 attached directly to a shielding 1315, a cold-finger 1352 attached to heat sink 1350, wherein the cold-finger is smaller than the heat sink, a DRB 1356 located adjacent to the cold-finger 1352; an AFE 1358 attached to the DRB along a shared interface, which may include analog signal manipulating circuitry that utilizes devices such as filters, amplifiers, and other electronic circuits; a CZT detector 1360, coupled directly to AFE 1358, which includes compounds and/or alloys of cadmium, zinc, and tellurium for detecting emitted radiation such as x-rays and gamma rays and which may include a wafer manufactured in a number of thicknesses for the desired sensitivity of the detector to radiative waves. The shielding 1315 may surround an entirety of the detector unit 1300, other than the pinhole openings. Detector unit 1300 also includes a rotational axis 1309 and rotates around a circumference defined by circle 1307. By including multiple SDPAs in detector unit 1300 the tilted radiation-collection angels α may be reduced to increase the radiation collection efficiency.

In some embodiments, a detector unit may fully utilize the rotational space of a detector unit without including one or more SDPAs. For example, FIG. 14 shows an example detector unit that fully utilizes the rotational volume of the detector unit while using only a parallel collimator. In particular, FIG. 14 shows a detector unit with a parallel collimator combined with variable parallel collimators of various widths. First parallel collimator 1480 may be substantially similar to the parallel collimators of FIGS. 3-6, such as collimator 460 of FIG. 4. On each side of first parallel collimator 1480 is a second, variable parallel collimator 1481, and on the other side of first parallel collimator 1480 is a third, variable parallel collimator 1482. The collimator bores of second and third collimators 1481, 1482 may include bores of varying length and/or width. For example, each collimator bore may be progressively shorter in length in an outward direction from the first parallel collimator 1480 while maintaining an equal width. In other examples not shown, more or less collimator bores may be present, with the width of each bore corresponding to the number of bores (e.g., if there are fewer bores, each bore may be wider).

The detector unit 1400 includes similar components as the detector unit 414, and may be included in the system of FIG. 1 and/or FIG. 2. Specifically, the detector unit 1400 includes a heat sink 1450 attached directly to a shielding 1415, a cold-finger 1452 attached to heat sink 1450, wherein the cold-finger is smaller than the heat sink, a DRB 1456 located adjacent to the cold-finger 1452; an AFE 1458 attached to the DRB along a shared interface, which may include analog signal manipulating circuitry that utilizes devices such as filters, amplifiers, and other electronic circuits; a CZT detector 1460, coupled directly to AFE 1458, which includes compounds and/or alloys of cadmium, zinc, and tellurium for detecting emitted radiation such as x-rays and gamma rays and which may include a wafer manufactured in a number of thicknesses for the desired sensitivity of the detector to radiative waves. The shielding 1415 may surround an entirety of the detector unit 1400, other than the bore opening end of the parallel collimator 1480, 1481, 1482, where an end cap 1467 may be located. Detector unit 1400 also includes a rotational axis 1409 and rotates around a circumference defined by circle 1407. Additionally, detector unit 1400 includes two additional detectors, 1461 and 1462, each coupled to a respective variable parallel collimator, as well as two additional AFEs 1471 and 1472, each in contact with a respective detector.

Thus, a swiveling detector unit configured to rotate during scanning may be provided with additional detector pixels along a width of the detector unit, to increase the sensitivity of the detector unit. To direct radiation to the additional detectors, one or more SDPAs may be present, in addition to and separate from a parallel collimator used to direct radiation to the standard central detector. However, in some embodiments, instead of using SDPAs, additional parallel collimators of varying length, for example, may be provided. In other examples, the parallel collimator may be dispensed with altogether and replaced with one or more SDPAs.

Figure 15:
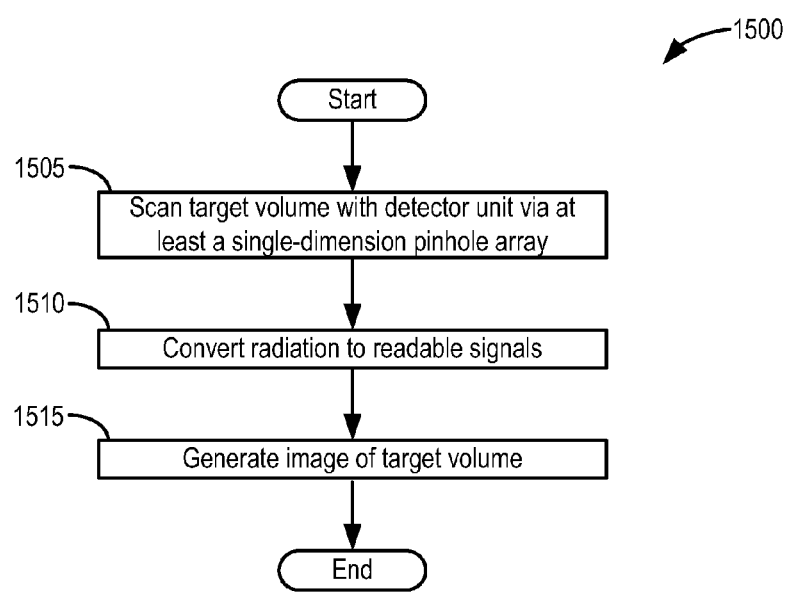
FIG. 15 is a flow chart illustrating a method for scanning a target volume with a detector unit.

Turning to FIG. 15, a method 1500 for scanning a target volume with a detector unit is illustrated. Method 1500 may be carried out by a processing unit of a NM imaging system, such as the processing unit 150 of FIG. 1, according to non-transitory instructions executed by the processing unit.

Method 1500 includes, at 1505, scanning a target volume with a detector unit configured to detect radiation from the target volume. The radiation is directed to a detector assembly of the detector unit via at least a single-dimension pinhole array. For example, the detector unit may be the detector unit 414 of FIG. 4, and radiation may be directed through a first single-dimension pinhole array, a second single-dimension pinhole array, and a parallel collimator. The detector assembly may include a pixelated detector wafer comprising CZT, for example. The scanning may include swiveling, spinning, rotating, translating, linear scanning or otherwise moving the detector unit across a scanning path.

At 1510, the detector assembly converts the radiation to readable signals, such as light or other electrical energy that may be converted to an image of the target volume. The target volume may include a patient area or single point source. At 1515, method 1500 includes generating an image of the target volume based on the radiation collected during the scanning. The image may be output to a display and/or stored for later playback.

Thus, the systems and method described herein provide for an imaging detector unit, comprising: a detector assembly to detect radiation and to generate electrical signals in response to the detected radiation; and a single-dimension pinhole array to direct the radiation to the detector assembly. The radiation may comprise gamma rays and/or X-rays. The single-dimension pinhole array may include an array of openings wherein each opening collects and directs the radiation in a first dimension and in a second dimension, the first and the second dimensions perpendicular to each other. The single-dimension pinhole array may collect and direct the radiation in the first dimension similar to a pinhole collimator and in the second dimension similar to a parallel collimator.

The detector assembly includes a plurality of pixels, and the single-dimension pinhole array comprises a plurality of pinholes arranged along a single dimension, each pinhole configured to direct radiation to one or more pixels of the plurality of pixels of the detector assembly. In one example, each pinhole is configured to direct radiation to three pixels of the plurality of pixels of the detector assembly.

The single-dimension pinhole array is a first single-dimension pinhole array configured to direct radiation to a first subset of the plurality of pixels of the detector assembly. In an example, the detector unit further comprises a second single-dimension pinhole array configured to direct radiation to a second subset of the plurality of pixels of the detector assembly. The imaging detector unit may further comprise a collimator assembly to direct radiation to a third subset of the plurality of pixels of the detector assembly. The collimator assembly comprises a plurality of parallel collimator holes, each parallel collimator hole positioned to direct radiation to one pixel of the third subset of the plurality of pixels of the detector assembly. The collimator assembly is disposed between the first single-dimension pinhole array and the second single-dimension pinhole array.

In an example, the imaging detector unit further comprises a third single-dimension pinhole array configured to direct radiation to a third subset of the plurality of pixels of the detector assembly.

The single-dimension pinhole array comprises a plurality of unit cells, each unit cell defining a pinhole and a chamber, wherein the pinhole is configured to direct radiation to the one or more pixels via the chamber, and wherein the single-dimension pinhole array is shaped as a right trapezoid prism. The detector assembly is a radiation detector comprising a direct conversion material. The direct conversion material comprises one or more of cadmium telluride (CdTe), cadmium zinc telluride (CZT or CdZnTe), gallium arsenide, or mercuric iodide. The imaging detector unit further comprises an axis of rotation around which the imaging detector unit is rotatable.

An embodiment of a detector unit comprises a detector assembly to detect radiation and to generate electrical signals in response to the detected radiation, the detector assembly comprising a plurality of pixels; a first single-dimension pinhole array to direct radiation to a first subset of the plurality of pixels of the detector assembly; a second-single-dimension pinhole array configured to direct radiation to a second subset of the plurality of pixels of the detector assembly; and a collimator assembly to direct radiation to a third subset of the plurality of pixels of the detector assembly.

The first, second, and third subsets of pixels comprise an entirety of pixels of the detector assembly. The first single-dimension pinhole array, second single-dimension pinhole array, and collimator assembly are comprised of a plurality of longitudinal dividers interleaved with a plurality of transverse dividers. Each transversal divider comprises a rectangular region, and wherein each longitudinal divider comprises a rectangular region, a first right trapezoidal region, and a second right trapezoidal region, the rectangular region of each transversal divider and the rectangular region of each longitudinal divider comprising a plurality of septa and intervening spaces.

The detector unit is a first detector unit of an imaging system further comprising: multiple additional detector units; a controller unit to adjust a position of one or more of the first detector unit and the multiple additional detector units; and a data-acquisition system to generate an image based on the radiation received at the first detector unit and the multiple additional detector units.

An embodiment of a method comprises scanning a target volume with a detector unit configured to detect radiation from the target volume, the radiation directed to a detector assembly of the detector unit via at least a single-dimension pinhole array; and generating an image of the target volume based on the radiation collected during the scanning. Scanning the target volume with the detector unit may comprise scanning the target volume with a detector unit comprising a parallel collimator and two side single-dimension pinhole arrays.

The technical effect of the disclosure may include generating an image of a target volume based on radiation received via a detector assembly including at least a single-dimension pinhole array.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. An imaging detector unit, comprising:
a detector assembly to detect radiation and to generate electrical signals in response to the detected radiation; and
a single-dimension pinhole array to collect and direct the radiation to the detector assembly, the single-dimension pinhole array shaped as a right trapezoid prism and including an array of openings wherein each opening collects and directs the radiation in a first dimension and in a second dimension, the first and the second dimensions perpendicular to each other.

2. The imaging detector unit of claim 1, wherein the detector assembly includes a plurality of pixels, and wherein the single-dimension pinhole array comprises a plurality of pinholes arranged along a single dimension, each pinhole configured to direct radiation to one or more pixels of the plurality of pixels of the detector assembly.

3. The imaging detector unit of claim 2, wherein each pinhole is configured to direct radiation to three pixels of the plurality of pixels of the detector assembly.

4. The imaging detector unit of claim 2, wherein the single-dimension pinhole array is a first single-dimension pinhole array configured to direct radiation to a first subset of the plurality of pixels of the detector assembly.

5. The imaging detector unit of claim 4, further comprising a second single-dimension pinhole array configured to direct radiation to a second subset of the plurality of pixels of the detector assembly.

6. The imaging detector unit of claim 5, further comprising a collimator assembly to direct radiation to a third subset of the plurality of pixels of the detector assembly.

7. The imaging detector unit of claim 6, wherein the collimator assembly comprises a plurality of parallel collimator holes, each parallel collimator hole positioned to direct radiation to one pixel of the third subset of the plurality of pixels of the detector assembly.

8. The imaging detector unit of claim 6, wherein the collimator assembly is disposed between the first single-dimension pinhole array and the second single-dimension pinhole array.

9. The imaging detector unit of claim 5, further comprising multiple single-dimension pinhole arrays which include at least a third single-dimension pinhole array configured to direct radiation to a third subset of the plurality of pixels of the detector assembly.

10. The imaging detector unit of claim 2, wherein the single-dimension pinhole array comprises a plurality of unit cells, each unit cell defining a pinhole and a chamber, wherein the pinhole is configured to direct radiation to the one or more pixels via the chamber.

11. The imaging detector unit of claim 1, wherein the detector assembly is a radiation detector comprising a direct conversion material.

12. The imaging detector unit of claim 11, wherein the direct conversion material comprises one or more of cadmium telluride (CdTe), cadmium zinc telluride (CZT or CdZnTe), gallium arsenide, or mercuric iodide.

13. The imaging detector unit of claim 1, further comprising an axis of rotation around which the imaging detector unit is rotatable.

14. A detector unit, comprising:
a detector assembly to detect radiation and to generate electrical signals in response to the detected radiation, the detector assembly comprising a plurality of pixels;
a first single-dimension pinhole array to direct the radiation to a first subset of the plurality of pixels of the detector assembly;
a second single-dimension pinhole array configured to direct the radiation to a second subset of the plurality of pixels of the detector assembly; and
a collimator assembly to direct the radiation to a third subset of the plurality of pixels of the detector assembly, wherein the first single-dimension pinhole array and the second single-dimension pinhole array each include an array of openings wherein each opening collects and directs the radiation in a first dimension and in a second dimension, the first and the second dimensions perpendicular to each other, and wherein the first single-dimension pinhole array, second single-dimension pinhole array, and collimator assembly are comprised of a plurality of longitudinal dividers interleaved with a plurality of transverse dividers.

15. The detector unit of claim 14, wherein the first, second, and third subsets of pixels comprise an entirety of pixels of the detector assembly.

16. The detector unit of claim 14, wherein each transverse divider comprises a rectangular region, and wherein each longitudinal divider comprises a rectangular region, a first right trapezoidal region, and a second right trapezoidal region, the rectangular region of each transversal divider and the rectangular region of each longitudinal divider comprising a plurality of septa and intervening spaces.

17. The detector unit of claim 14, wherein the detector unit is a first detector unit, and further comprising:
multiple additional detector units;
a controller unit to adjust a position of one or more of the first detector unit and the multiple additional detector units; and
a data-acquisition system to generate an image based on the radiation received at the first detector unit and the multiple additional detector units.

18. A method, comprising:
scanning a target volume with a detector unit configured to detect radiation emitted from the target volume, the radiation directed to a detector assembly of the detector unit via at least a single-dimension pinhole array, the detector unit comprising a parallel collimator and two side single-dimension pinhole arrays; and
generating an image of the target volume based on the radiation collected during the scanning, wherein the single-dimension pinhole array includes an array of openings wherein each opening collects and directs the radiation in a first dimension and in a second dimension, the first and the second dimensions perpendicular to each other.

19. An imaging detector unit, comprising:
a detector assembly to detect radiation and to generate electrical signals in response to the detected radiation; and
a single-dimension pinhole array to collect and direct the radiation to the detector assembly, the single-dimension pinhole array including an array of openings wherein each opening collects and directs the radiation in a first dimension and in a second dimension, the first and the second dimensions perpendicular to each other, wherein in the first dimension the single-dimension pinhole array collects the radiation received by the openings similar to a pinhole collimator, and in the second dimension the single-dimension pinhole array collimates the radiation from the openings similar to a parallel-hole collimator.

20. The imaging detector unit of claim 19, wherein the detector assembly includes a plurality of pixels, and wherein the single-dimension pinhole array comprises a plurality of pinholes arranged along the second dimension, each pinhole configured to direct radiation in the first dimension to one or more pixels of the plurality of pixels of the detector assembly.

21. The imaging detector unit of claim 19, wherein the detector assembly is a radiation detector comprising a direct conversion material.

22. The imaging detector unit of claim 21, wherein the direct conversion material comprises one or more of cadmium telluride (CdTe), cadmium zinc telluride (CZT or CdZnTe), gallium arsenide, or mercuric iodide.

23. The imaging detector unit of claim 19, further comprising an axis of rotation around which the imaging detector unit is rotatable.

* * * * *